(12) United States Patent
Deros et al.

(10) Patent No.: US 11,064,565 B2
(45) Date of Patent: Jul. 13, 2021

(54) SYSTEMS AND METHODS FOR PERSONIFYING INTERACTIVE DISPLAYS USED IN HOTEL GUEST ROOMS

(71) Applicant: ATOM, Inc., Scottsdale, AZ (US)

(72) Inventors: Yani Deros, Phoenix, AZ (US); Jodi Deros, Phoenix, AZ (US)

(73) Assignee: ATOM, Inc., Scottsdale, AZ (US)

( * ) Notice: Subject to any disclaimer, the term of this patent is extended or adjusted under 35 U.S.C. 154(b) by 0 days.

(21) Appl. No.: 16/418,935

(22) Filed: May 21, 2019

(65) Prior Publication Data

US 2019/0342942 A1 Nov. 7, 2019

Related U.S. Application Data

(63) Continuation-in-part of application No. 16/163,186, filed on Oct. 17, 2018, which is a continuation of application No. 15/793,982, filed on Oct. 25, 2017, now Pat. No. 10,111,277, which is a continuation-in-part of application No. 15/636,546, filed on Jun. 28, 2017, now Pat. No. 10,383,170, which is a continuation-in-part of application No.

(Continued)

(51) Int. Cl.
| | |
|---|---|
| *H04W 84/12* | (2009.01) |
| *H04W 4/021* | (2018.01) |
| *H04W 4/70* | (2018.01) |
| *H01R 31/06* | (2006.01) |
| *H02J 50/80* | (2016.01) |
| *H04W 4/00* | (2018.01) |
| *H02J 50/20* | (2016.01) |
| *H01R 27/00* | (2006.01) |
| *H01R 13/66* | (2006.01) |

(52) U.S. Cl.
CPC .......... *H04W 84/12* (2013.01); *H01R 31/065* (2013.01); *H02J 50/80* (2016.02); *H04W 4/00* (2013.01); *H04W 4/021* (2013.01); *H04W 4/70* (2018.02); *H01R 13/6675* (2013.01); *H01R 27/00* (2013.01); *H02J 50/20* (2016.02)

(58) Field of Classification Search
CPC ..... G10L 15/25; G06F 3/011; G06K 9/00268; G06K 9/6293
See application file for complete search history.

(56) References Cited

U.S. PATENT DOCUMENTS

| | | |
|---|---|---|
| 6,121,695 A | 9/2000 | Loh |
| 6,447,357 B1 | 9/2002 | Pearl |

(Continued)

OTHER PUBLICATIONS

International Search Report, PCT/US18/40107 dated Sep. 24, 2018; 4pgs.
Written Opinion, PCT/US18/40107 dated Sep. 24, 2018; 5pgs.

*Primary Examiner* — Chandrahas B Patel
(74) *Attorney, Agent, or Firm* — Jennings Strouss & Salmon PLC; Daniel R. Pote

(57) ABSTRACT

An in-room IOT control system includes a base module, a voice and touch interactive display extending above the base module, and a controller operable by the user to remotely (e.g., wirelessly) control the state of a plurality of environmental features including temperature, music, lighting, curtains, water, hotel services, amenities and entertainment. The display includes a digital mouth, the movement of which is synchronized to synthesized speech spoken by the module.

14 Claims, 27 Drawing Sheets

Related U.S. Application Data

15/586,191, filed on May 3, 2017, now Pat. No. 10,021,801, which is a continuation of application No. 14/622,850, filed on Feb. 14, 2015, now abandoned.

(60) Provisional application No. 61/940,160, filed on Feb. 14, 2014.

(56) References Cited

U.S. PATENT DOCUMENTS

| | | | |
|---|---|---|---|
| 8,549,658 B2 | 10/2013 | Kolavennu | |
| 9,060,197 B2 | 6/2015 | Warrick | |
| 9,080,782 B1 | 7/2015 | Sheikh | |
| 9,255,661 B2 * | 2/2016 | Quijano | F16M 11/18 |
| 10,657,972 B2 * | 5/2020 | Hall | G06F 40/58 |
| 2002/0089820 A1 | 7/2002 | Abboud | |
| 2003/0007321 A1 | 1/2003 | Dayley | |
| 2007/0072474 A1 | 3/2007 | Beasey | |
| 2007/0079042 A1 | 4/2007 | Crosswy | |
| 2012/0172027 A1 | 7/2012 | Partheesh | |
| 2015/0130270 A1 | 5/2015 | Peto | |
| 2016/0241999 A1 | 8/2016 | Chin et al. | |
| 2016/0374413 A1 | 12/2016 | Kweon | |
| 2018/0130459 A1 * | 5/2018 | Paradiso | G06T 13/00 |
| 2018/0268747 A1 * | 9/2018 | Braun | G06T 19/006 |
| 2020/0195463 A1 * | 6/2020 | Johnson | H04L 12/2816 |

* cited by examiner

SYSTEMS AND METHODS FOR PERSONIFYING INTERACTIVE DISPLAYS USED IN HOTEL GUEST ROOMS

CROSS-REFERENCE TO RELATED APPLICATIONS

This is a continuation-in-part application claiming priority to U.S. patent application Ser. No. 16/163,186 filed Oct. 17, 2018; U.S. patent application Ser. No. 15/793,982 filed Oct. 25, 2017; U.S. patent application Ser. No. 15/636,546 filed Jun. 28, 2017; U.S. patent application Ser. No. 15/586,191 filed May 3, 2017; U.S. patent application Ser. No. 14/622,850 filed Feb. 14, 2015; and U.S. provisional patent application Ser. No. 61/940,160 filed Feb. 14, 2014. The entire contents of all of the foregoing applications are hereby incorporated herein by this reference.

FIELD OF THE INVENTION

The present invention relates, generally, to an interactive module for controlling electronic devices and features in a hotel room and, more particularly, to techniques for imparting personality characteristics to a display associated with the control module.

BACKGROUND

Most major hotel chains, property brokers, timeshare companies and aggregators offer proprietary rewards mobile applications (referred to herein as mobile apps) to their members, including loyalty programs promoted by Wyndham Rewards™, Marriott™, Choice™ Hotels, Hotels.com, the Ritz-Carlton™, Hilton Honors™, Hotels.com™, Inter-Continental Hotels Group (IHG™), Hyatt™, and Starwood Preferred Guest (SPG™). These rewards programs are intended to increase the frequency and quality of customer engagement, and to foster brand engagement. However, adoption has been sluggish because downloading and configuring the app is perceived as cumbersome and time consuming.

Presently known methods used by hotel guests to obtain information on property amenities, guest/room services, travel and entertainment schedules generally involve: i) dialing the hotel operator or concierge; and ii) using the TV remote to navigate information displayed on an in-room television screen or reviewing printed materials in the room that needs to be updated daily or weekly. As social media replaces these traditional tools, the hospitality industry seeks new and improved devices, systems, and methods for overcoming the limitations of the prior art and re-capturing in-room "touch points" which enhance the guest experience with new technologies.

BRIEF SUMMARY

The present invention involves an in-room, interactive control module used by guests to control their immediate environment and otherwise interact with hotel resources and the outside World. Various embodiments include a display atop the control module, where the user interface presents a digital "mouth" configured to impart personality attributes to the display to make a direct connection and more engaging guest experience. The mouth, either alone or in conjunction with other features and techniques, transforms and advances an otherwise traditional voice command component into an anthropomorphic element reminiscent of personality. Further embodiments allow the size, shape, speed, and other indicia of lip motion to be manipulated to thereby impart a visual dimension to the device's "personality".

For example, by synchronizing the movement of a graphical mouth to the voice content being delivered, the display may be perceived as "speaking," as opposed to merely replaying digital content. The present inventors posit that this personification increases user engagement, and provides for a more robust and engaging (and memorable) guest experience.

In contrast to generally circular wall-mounted display interfaces (e.g., the NEST thermostat), some embodiments of the present system exhibit a traditional robot form, in the sense that a tilted "display face" and "head" extends from the top of a unified or modular "body" and thus forms an underlying human metaphor to which personality attributes may be more intuitively attached.

There is also a need for a PaaS solution combined with (or including) an in-room IOT control system which may be controlled by a loyalty mobile app or service campaign, and which tracks guest location, interests, feedback and needs to thereby enable customized guest experiences and targeted marketing programs informed by contextual awareness, such as whether the guest is travelling for business or pleasure as well as personal preferences that can be migrated from property to property. Furthermore, the integrated display and interface can be hosted locally or remotely without the need for the guest to download a mobile app.

To achieve the foregoing and other objectives in accordance with the present invention as broadly described herein, various embodiments comprise: i) a hotel-wide or enterprise-wide PaaS system; ii) a room based IOT network including a base module configured to control a plurality of peripheral network devices (e.g., lights, television, router, radio, telephone, shades, water, thermostat) or embedded building infrastructure sensor solution; iii) a mobile app which is separately downloadable or embedded within an existing hotel brand app running on the guest's mobile device, the app configured to interface with and control the IOT network and coordinate hotel services; iv) a location tracking service managed by the app and configured to monitor the location of the guest on and/or off the hotel property; and v) an analytics and/or machine learning engine configured to augment the location data with contextual awareness, to thereby facilitate enhanced customization of the guest experience and transmit targeted marketing messages to the guest (e.g., in in real time) to generate additional revenue channels for the property; vii) configuring the PaaS system to deliver an Application Program Interface (API) allowing the hotel property manager to monitor and control the IOT devices to reduce power and water usage within each hotel room independently or within a select property space conveniently and effectively to yield additional cost savings for utilities throughout the facility; viii) wirelessly controlling room temperature through a controller positioned within a bedside module; ix) thermal mapping and other motion mapping using multiple sensors (including but not limited to Radar) within a guest room; x) radar or other sensor modalities may be provided to sense respiratory breathing and rhythms of sleeping of resting guests; xi) promoting conservation through gamification coupled with a loyalty rewards component; xii) migration of guest personal preferences that can move from property to property; and xiii) configuring the API to offer hotel managers the ability to set thresholds or limits to thereby track and manage utility usage within each hotel room and other areas on the property.

In an embodiment, the IOT control system comprises a base unit adapted for electrical communication with a high voltage power source, and a plurality of stacked electronic modules adapted for wirelessly receiving communications from the base including high voltage power, low voltage DC power, data, and control signals.

Each stacked electronic module may be configured to communicate with, monitor, embody, interface with and/or control one or more of the following IOT devices: computing and communication devices for facilitating hotel services such as room service and concierge services, electronic card readers, hard drives, lamps, batteries, speakers, clocks, fans, pencil sharpeners, cup holders, staplers, mug warmers, stock tickers, displays, personal computers, electric staplers, tape dispensers, pencil holders, game controllers, wireless chargers, post-it note dispensers, coffee makers, refrigerators, web cameras, wireless receivers, wireless transmitters, Blue ray/CVD/CD/disk drives, baby monitors, air fresheners, mobile device stands, air ionizers, motion sensors, power interfaces, laptop and smart phone docking and charging stations, home controls, game controllers, thermostats, fire alarm/smoke/CO detectors, gestural interfaces, numeric/calculator pads, scanners, eye tracking devices, flash drives, wireless pads/styluses wireless mouses, wireless keyboards, wireless charging stations, web cameras, wireless receivers, wireless transmitters, battery power sources, IO panel/instrument jack, spare plug outlets (similar to a power strip), wireless headphone transmitters, auxiliary interfaced or wireless screens/displays, credit/debit card chip and magnetic stripe readers, HVAC systems, displays, personal computers, shade, blind, and other window covering controllers, door and window locks, faucets, showers, toilets, sinks, water leak detectors, and combinations thereof.

In various embodiments the hotel guest may be incented to enable location, proximity and personalization services in exchange for a downloadable mobile app for remotely controlling the in-room IOT control module that in turn controls the immediate room environment, as well as discounts, enhanced services, gaming points, and other perks and rewards which may be derived from the location data alone or augmented with contextual awareness.

In the context of this disclosure, the terms hotel and property may also contemplate motels, apartment complexes, timeshares, or any other type of residence.

By way of non-limiting example, contextual awareness may include "knowing" that the guest is primarily or currently attending to business or pleasure, the guest's short term and/or long term itinerary, the guest's previous locations (conference room, restaurant, office building, movie theater), and unique user preferences relating to cuisine, entertainment, lifestyle, music, and environmental comfort metrics such as lighting, room temperature, mattress firmness, and the like. Additional contextual awareness metrics may include monitoring when location data goes dark, and thereafter re-emerges in another city, suggesting that the guest has flown from one city to another.

Additionally the PaaS system may be configured to learn guest habits, routines and preferences to intelligently (e.g., algorithmically) prepare the hotel room to accommodate desired environmental factors including temperature, lighting, window shade position, entertainment, and consumable items such as beverages and food that would deliver an inviting and welcoming room presence to drive loyalty for the property and brand.

BRIEF DESCRIPTION OF THE DRAWING FIGURES

These and other features, aspects, and advantages of the present invention will become better understood with reference to the following description, appended claims, and accompanying drawings, where:

Figure 27:
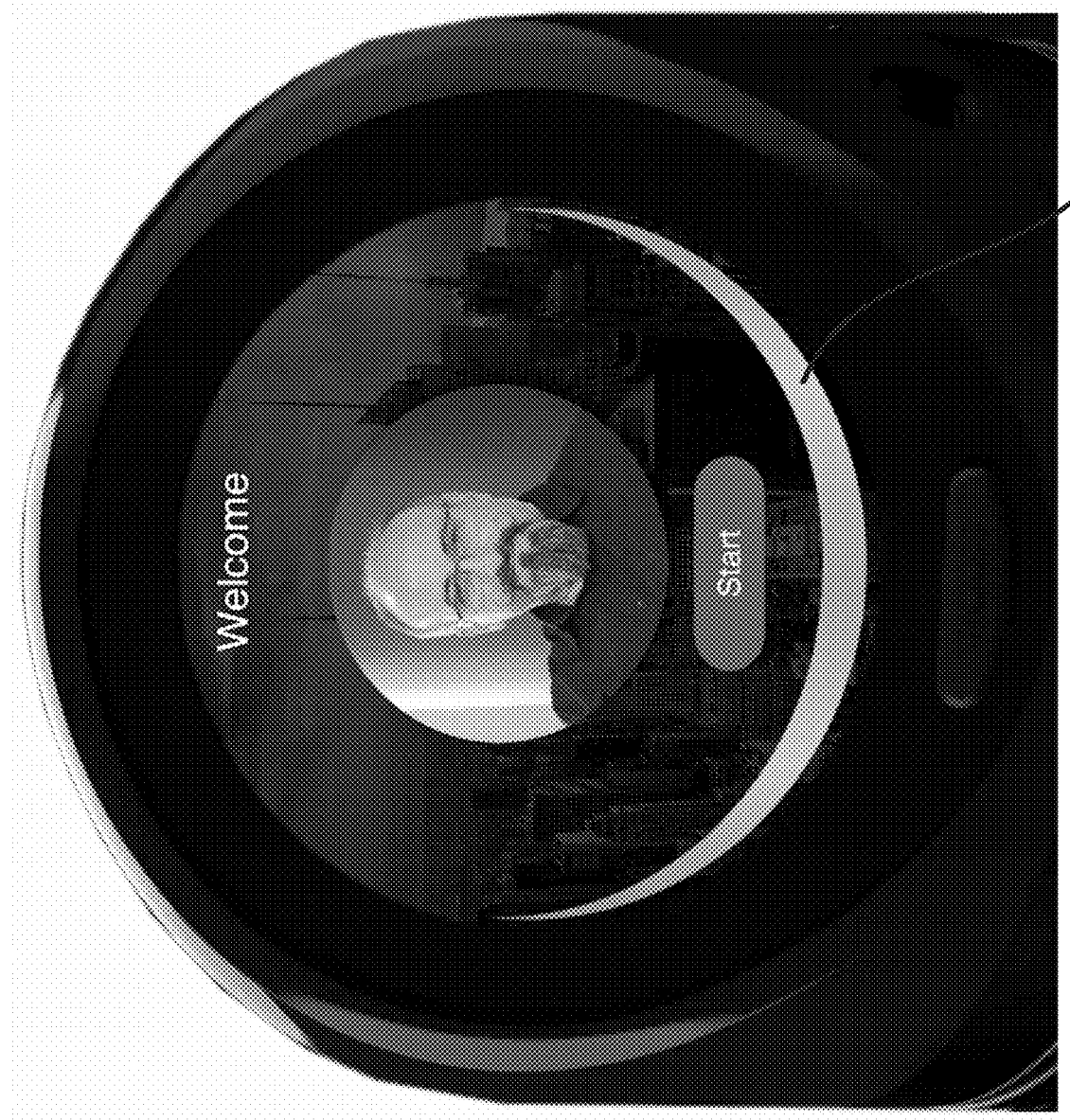
Figure 28:
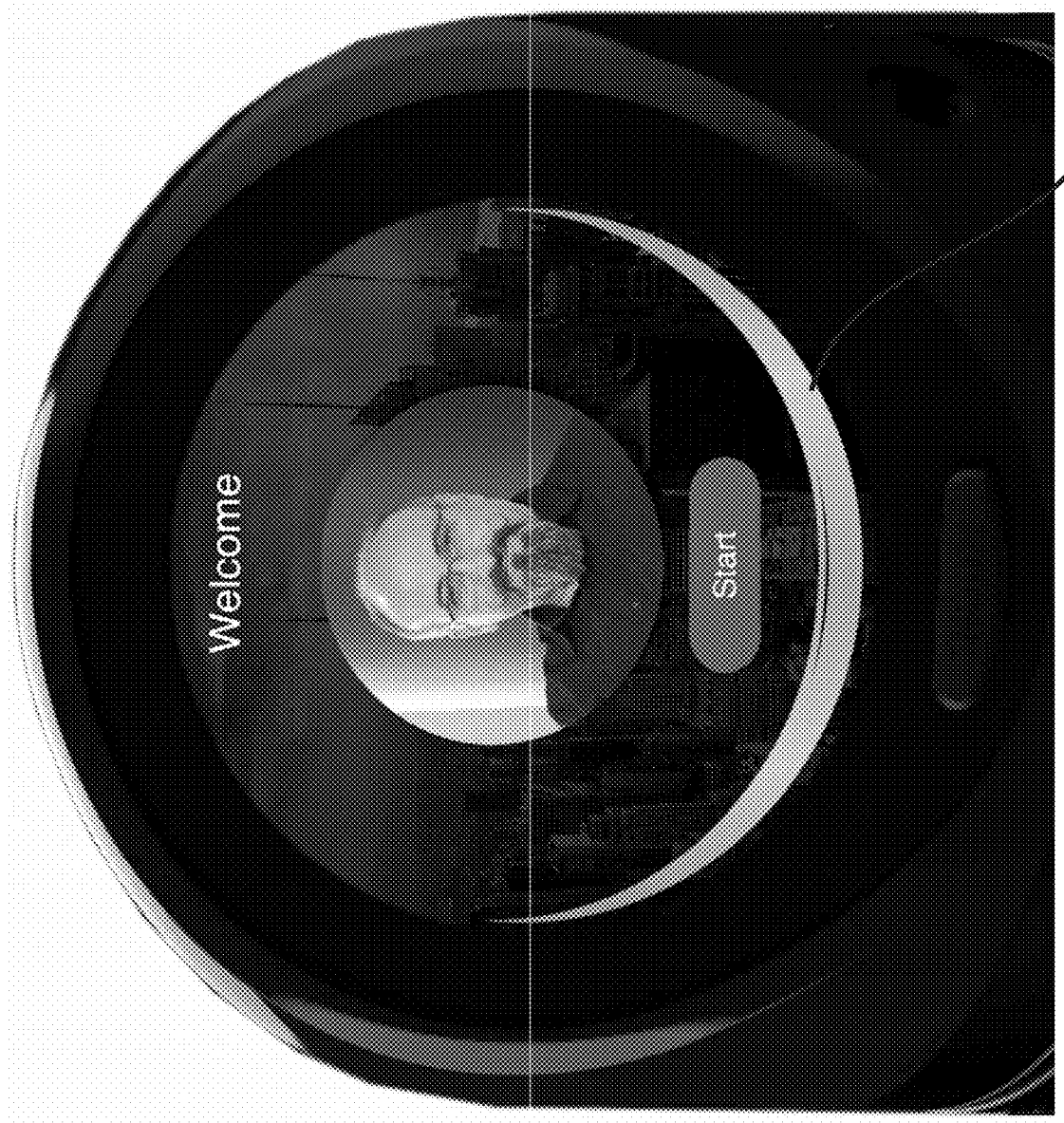
Figure 29:
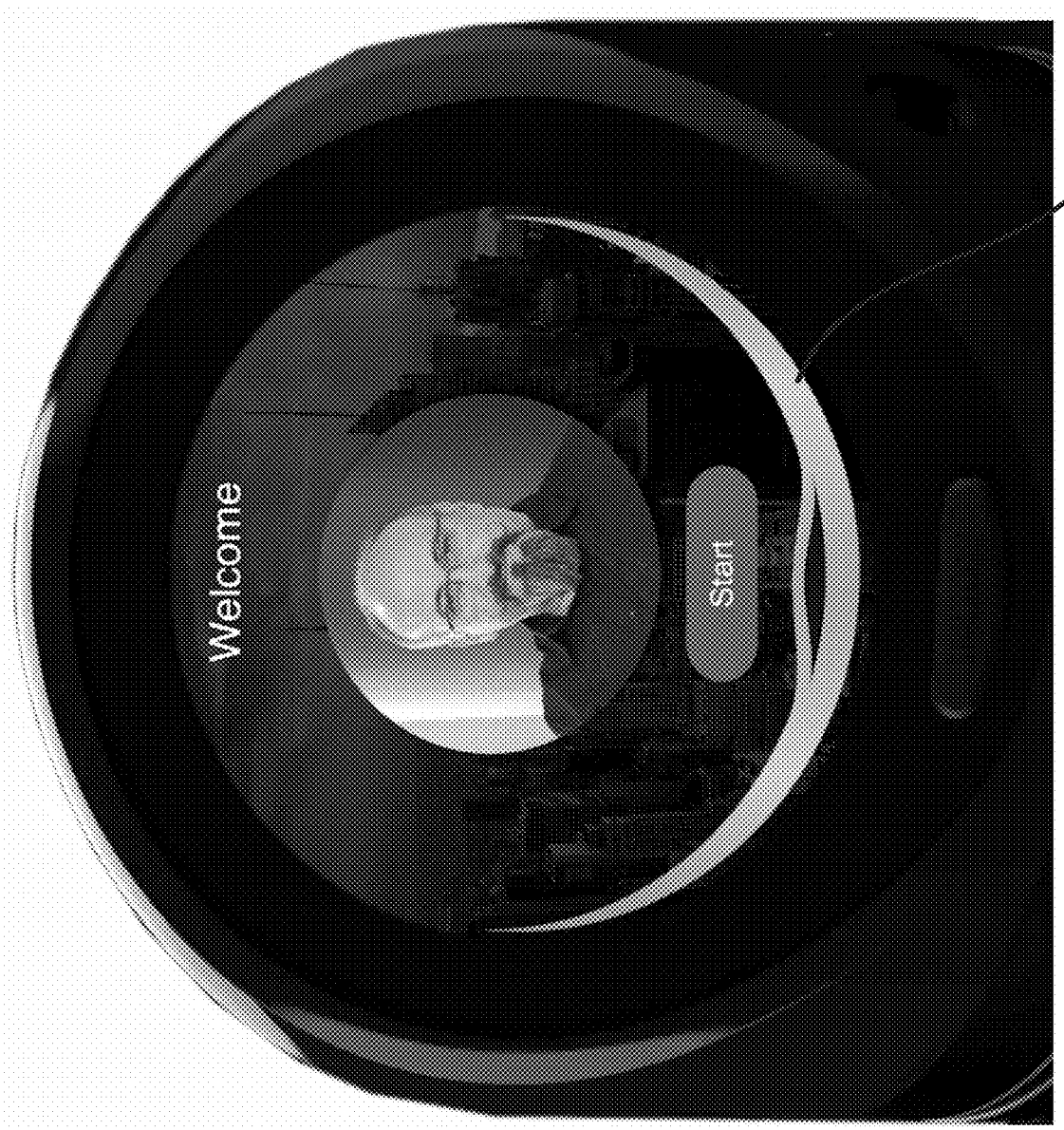

FIG. 27 is a schematic view of an anthropomorphic display depicting the mouth fully extended prior to speaking in accordance with various embodiments; and FIG. 28 is a schematic view of an anthropomorphic display depicting the mouth with lips narrowly parted to indicate commencement of a speech packet in accordance with various embodiments; and FIG. 29 is a schematic view of an anthropomorphic display depicting the mouth with lips widely parted to indicate termination of a speech packet in accordance with various embodiments.

DETAILED DESCRIPTION OF PREFERRED EXEMPLARY EMBODIMENTS

Various embodiments disclose a round (e.g., circular) display which, together with the control module to which it is attached, facilitate voice and touch interaction, although the speaker and microphone need not be located within the perimeter of the display. Textual, graphical, and other digital content is presented on the display, augmented with sound, haptics, sensors, colors, scents, and other features to facilitate a more intimate user experience, as described in more detail below.

In a preferred embodiment, a digital representation of mouth (which may include separating lips to simulate pronunciation) is presented on the display, with the visual mouth movements synchronized to the audible sounds of the synthesized speech, to give the impression that the display "speaking." This anthropomorphic metaphor of a display screen which appears to speak facilitates the human/machine bond, enhancing the user experience.

Various embodiments contemplate cloud based voice synthesizing systems and techniques, where the particular style in which the synthesized speech is presented may be selected by the system or by the user. Voice personification may include male, female, gender neutral, gender fluid, or other non-binary modalities.

Vocal inflexion of the synthesized speech can be further enhanced with various equalizer functions such as base, treble, foreign language accents and local dialects, idiomatic word selection, and the like. Artificial Intelligence (AI) and machine learning (ML) techniques can be used to "learn" the user's moods and emotions, allowing the synthesized voice to match the user's current mood and thereby deepen the interaction. The device can be programmed to learn verbal cues from the human to allow the system to quickly predict human mood changes, and respond accordingly (e.g., use a softer voice when the device senses frustration; use a more whimsical in voice in response to a perceived desire for humorous interaction).

For speech content currently in the pipeline, that is, speech packets selected by the system and queued up to be "spoken" by the module, the device can learn to pause, suspend, or terminate the speech packet to avoid interrupting or confronting the user, for example if the system detects that the user begins or resumes speaking while the module is delivering synthesized speech.

The system can also be programmed to enhance privacy by clearing data from the screen and terminating the current speech packet in response to a "Shh" or analogous user command, for example if another person walks into the room or otherwise advances to within hearing distance or within viewing distance of the display screen.

In one embodiment the digital mouth implements simulated speech in a manner similar to or opposite to that of a person; that is, while a human typically moves his lower jaw during speech, the digital mouth described herein may be configured to simulate movement of the upper lip, lower lip, and/or both lips. When not speaking, the digital mouth may be programmed to assume a "non-speaking" or sleep mode position, such as fading or disappearing entirely into a circle or diminishing dot at the 6:00 o'clock position.

Further embodiments permit the digital mouth to simulate any number of "emoji" type expressions used in social media and texting applications, such as a "sassy" expression with the mouth being skewed to one side or shifting a graphical feature around the lip are at the bottom of the circular screen. In this regard, the system may include an emoji database from which discrete emojis or sequences of emojis can be incorporated into the digital mouth. Unlike conventional static emojis, the present invention further contemplates dynamically configurable (or "moving") expressions based on emojis.

Other embodiments contemplate a motorized display configured to pivot up and down to simulate nodding, or pivoting left-to-right to indicate agreement, or turning about a horizontal and/or vertical are to maintain line of sight with the user. Other facial features may include graphical depictions of eyes, cheeks, a furled forehead, and the like. Haptics may be employed to add vibration to augment speech, such as laughter, shuddering, coughing, and the like.

With initial reference to FIGS. 17-29, the manner in which various personality traits may be imparted to the display will now be described, followed by a description of the subject matter of FIGS. 1-16.

Figure 16:
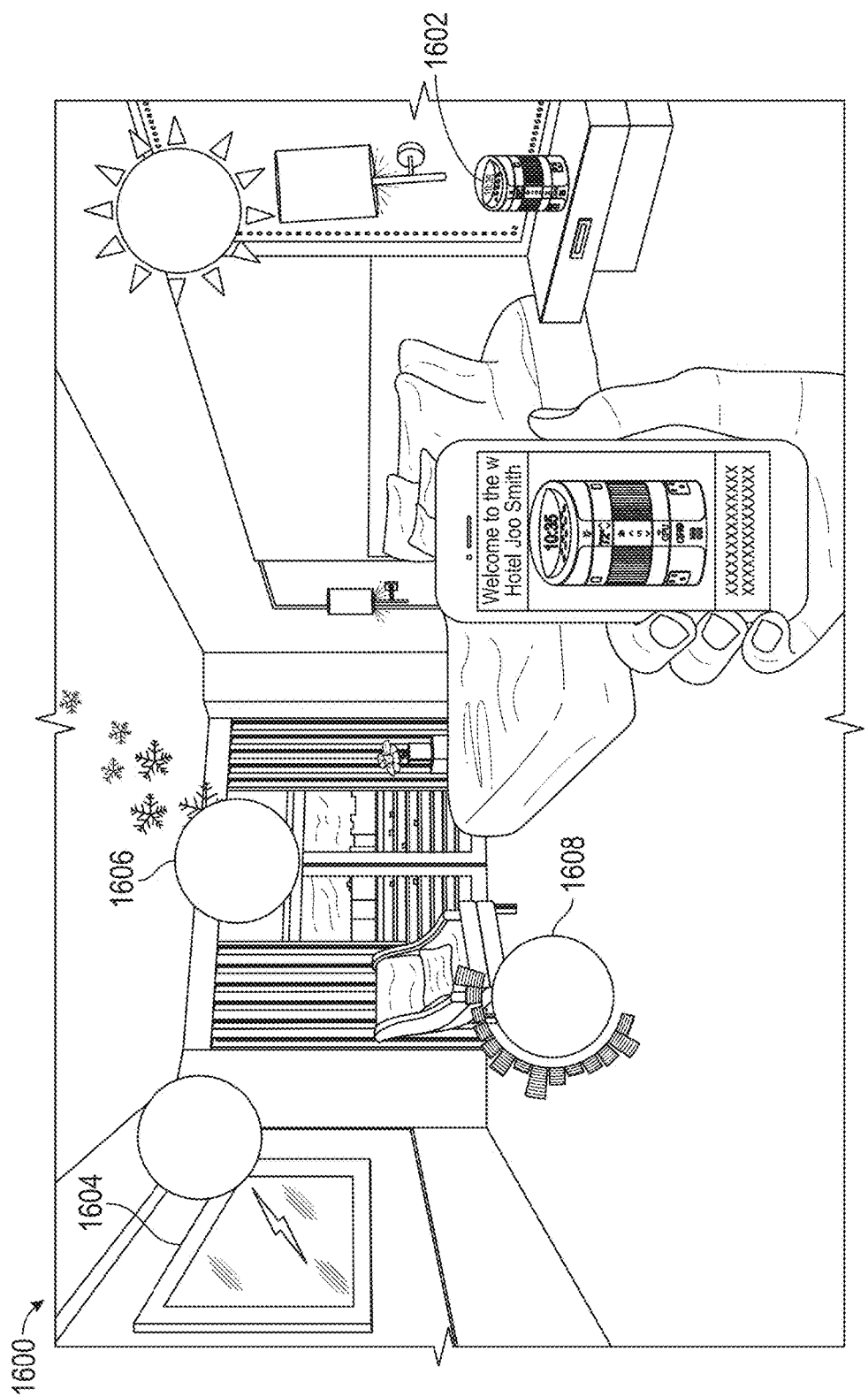
FIG. 16 is a schematic diagram of an in-room IOT module wirelessly coupled to a plurality of distributed sensors for monitoring motion and thermal zones in accordance with various embodiments.
Figure 17:
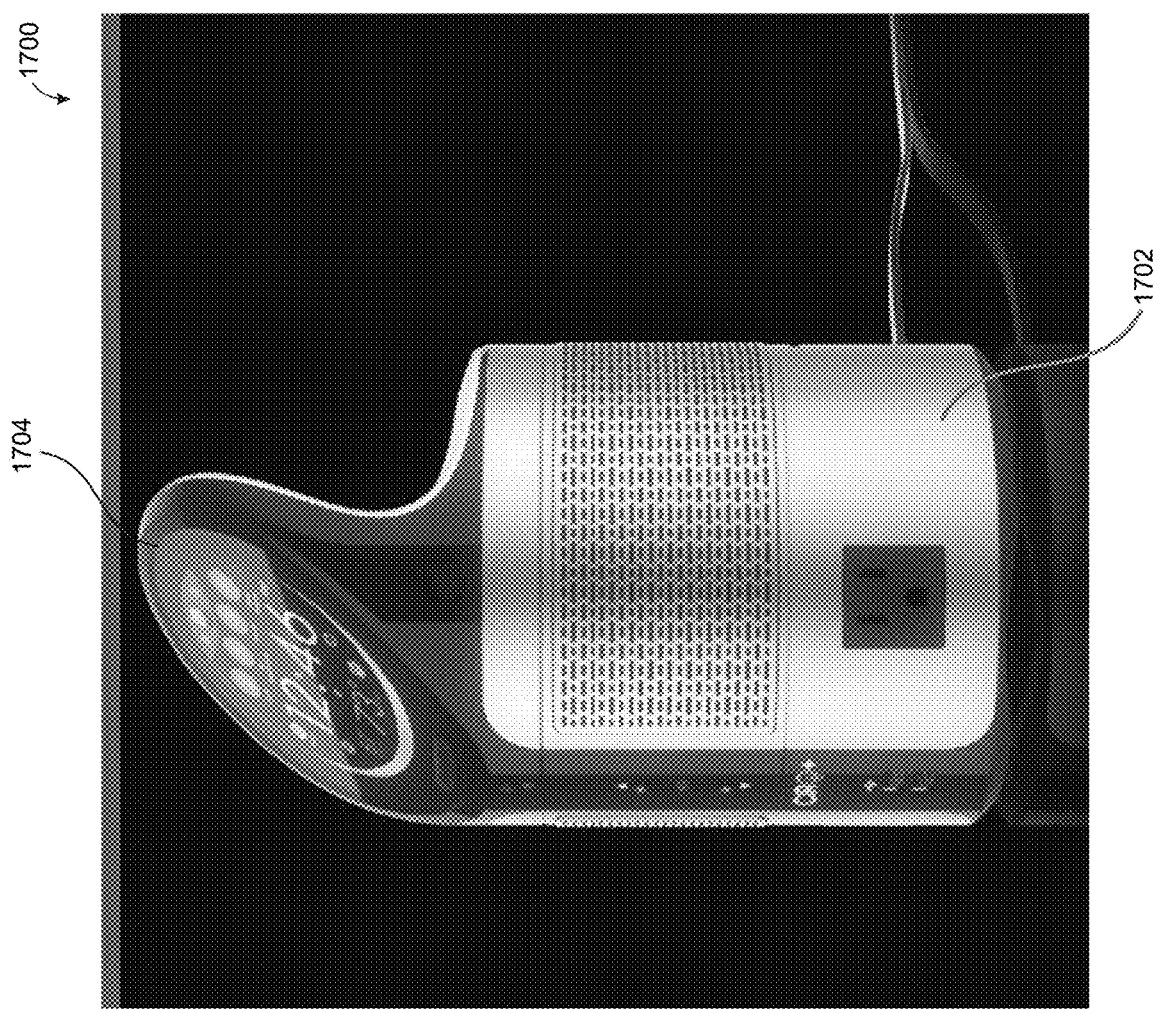
FIG. 17 is an exemplary view of a control module having a rounded display screen extending from the top of a cylindrical body in accordance with various embodiments.

FIG. 17 is a control module 1700 having a rounded display screen 1704 extending from the top of a cylindrical body 1702. In the illustrated embodiment, the body 1702 is configured to be placed on a table, counter-top, desk, night stand, or the like. The various features and functions of the module not related to the anthropomorphic display screen are discussed in detail below in conjunction with FIGS. 1-16.

Figure 18:
FIG. 18 is a front view of the control module of FIG. 17, illustrating a "face-to-face' view of the display screen in accordance with various embodiments.

FIG. 18 is a front view of an exemplary control module including a display screen 1804 extending from a body 1802.

Figure 20:
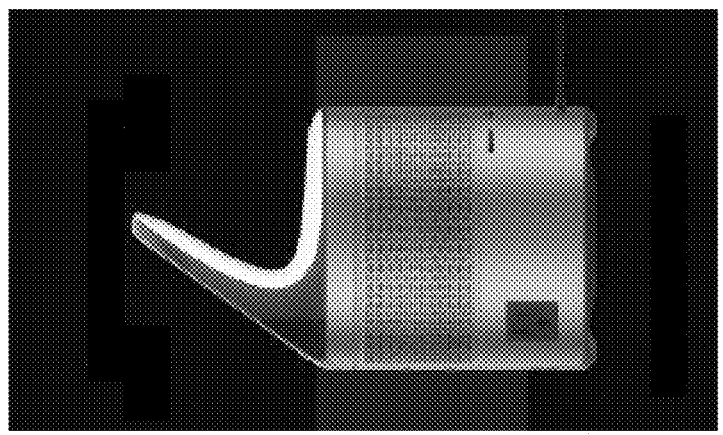
FIG. 20 is a side elevation view of the module shown in FIG. 17 in accordance with various embodiments.
Figure 19:
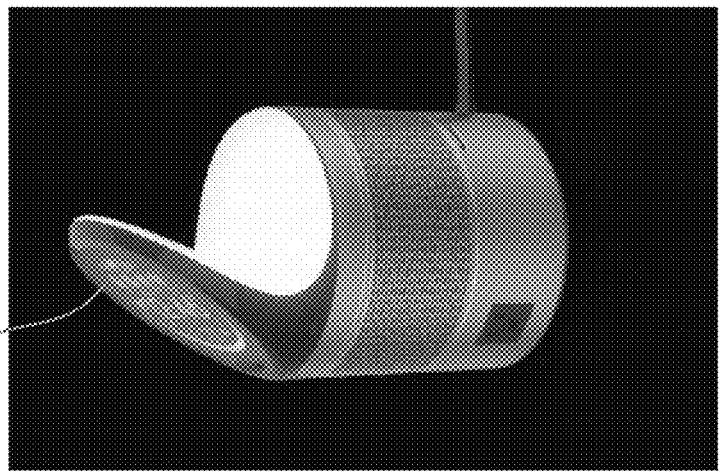
FIG. 19 is a top perspective view of the module of FIG. 17 in accordance with various embodiments.

FIG. 19 shows a display 1904 tilted with respect to the vertical axis of the body. FIG. 20 is a side elevation view of a control module showing the display tilted at an angle 2006 relative to a horizontal plane. Various embodiments contemplate a static or adjustable angle 2006 in the range of 30 to 90 degrees, and preferably about 45 to 60 degrees, and most preferably about 56 degrees.

Figure 21:
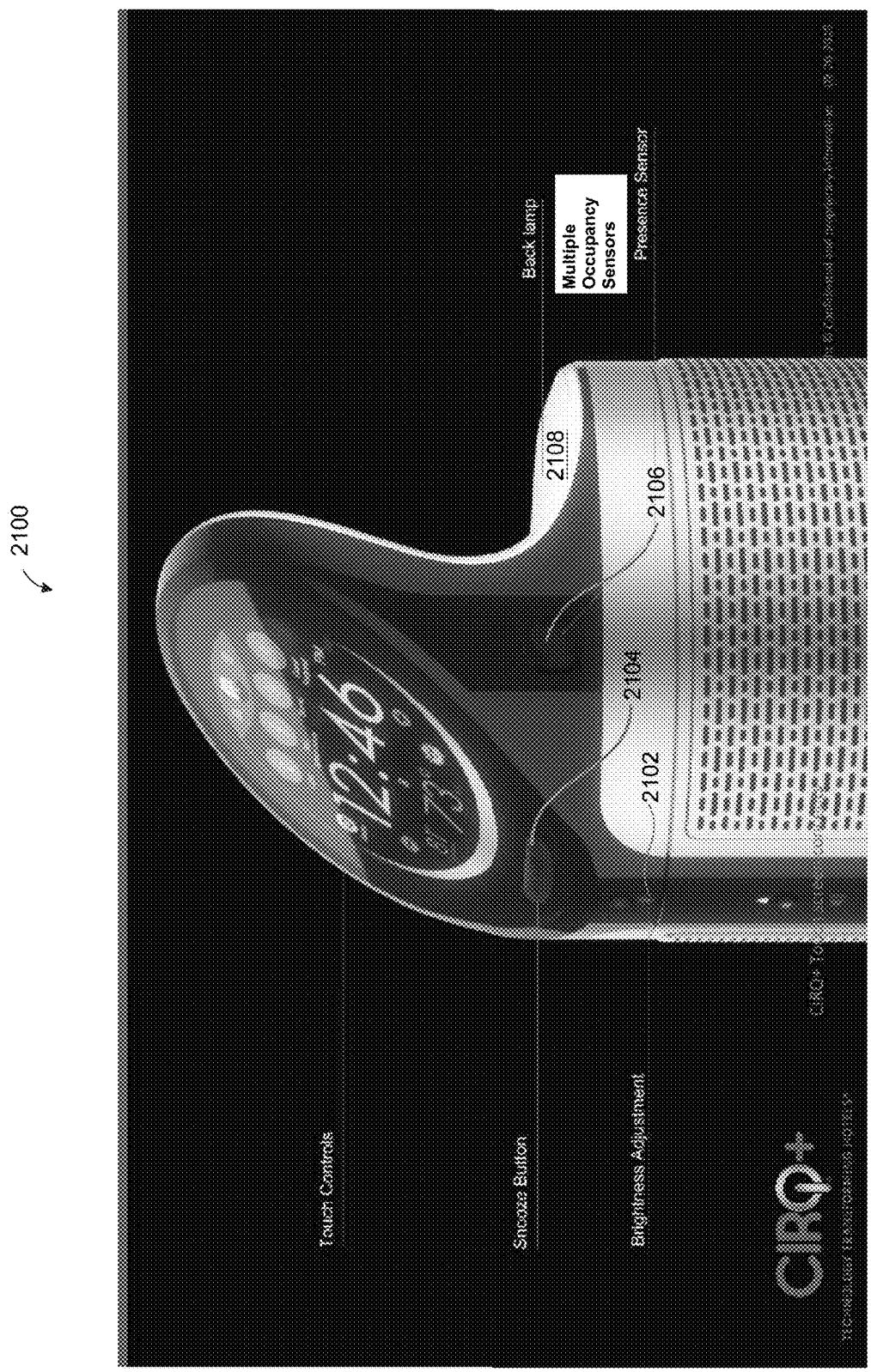
FIG. 21 is a detailed view of the display of FIG. 17, depicting various control features in accordance with various embodiments.

FIG. 21 is a control module 2100 depicting various control features including: a brightness adjustment 2102; a snooze button 2104; one or more occupancy, presence, or motion sensors 2106; and a lamp 2108.

Figure 22:
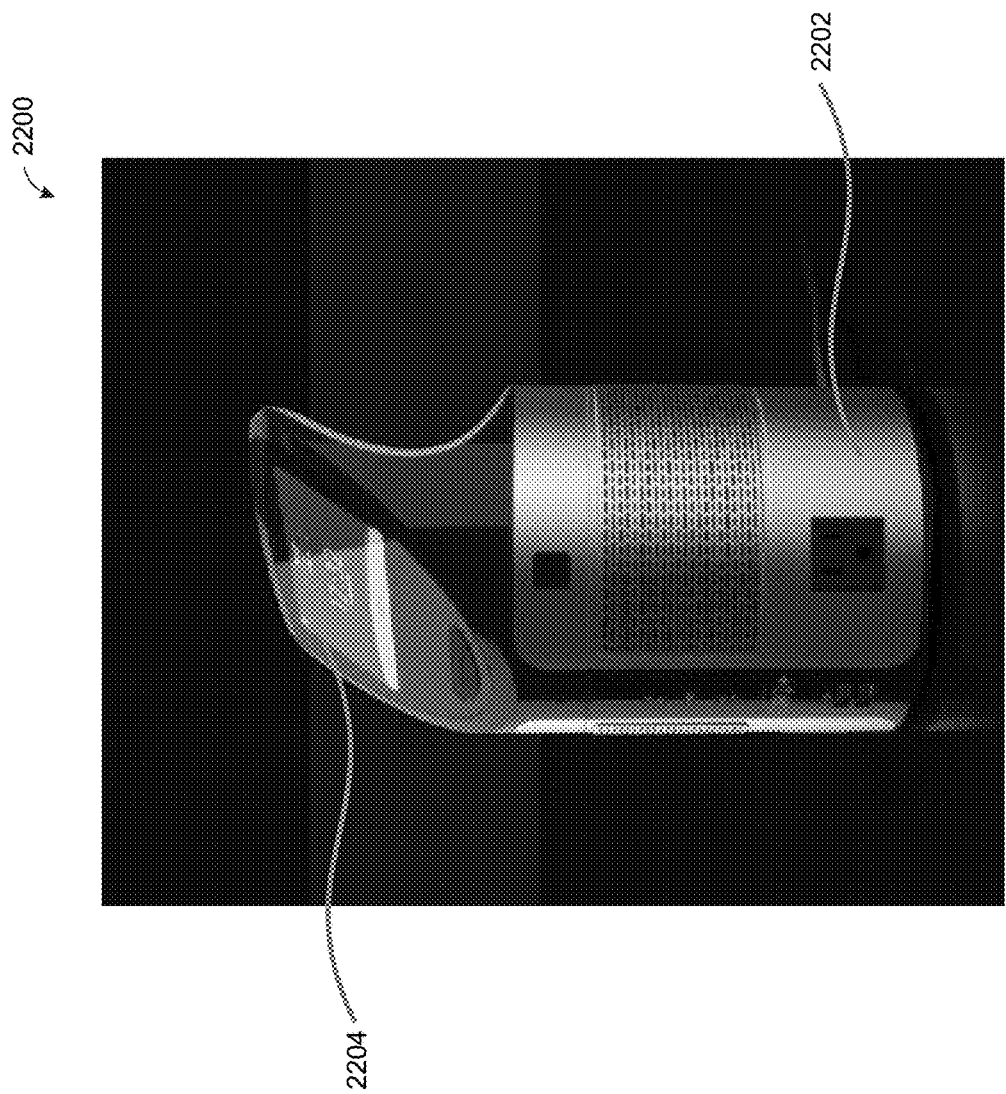
FIG. 22 is an alternate embodiment of a non-circular display screen in accordance with various embodiments.

FIG. 22 is an alternate embodiment of a control module including a base unit 2202 supporting a non-circular display screen 2204.

Figure 23:
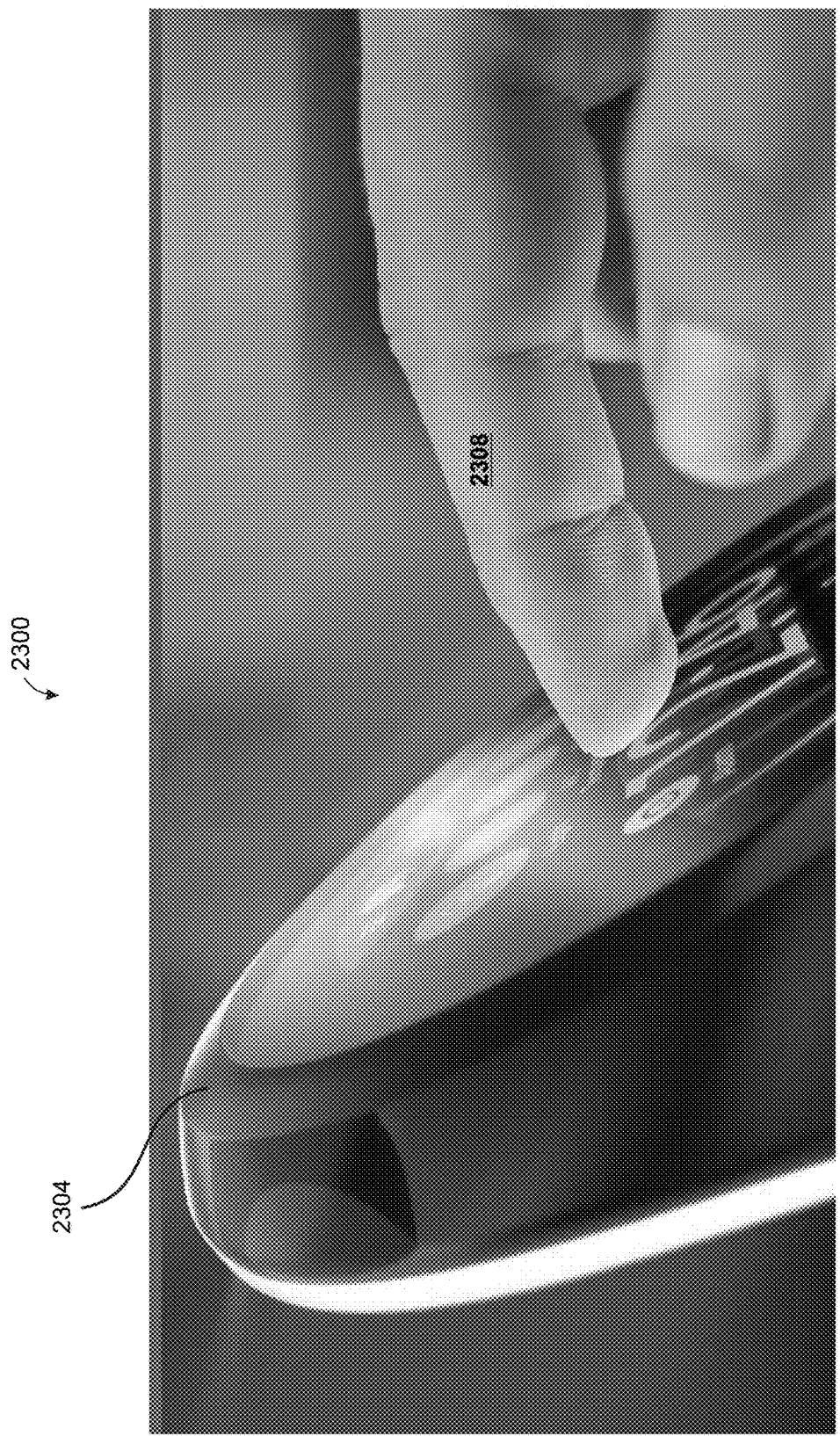
FIG. 23 is a detailed view of the display screen illustrating touch interaction with a hotel guest in accordance with various embodiments.

FIG. 23 is a close-up view of a touch interaction event 2300 involving a user (e.g., hotel guest) 2308 inputting a selection onto a display screen 2304.

Figure 24:
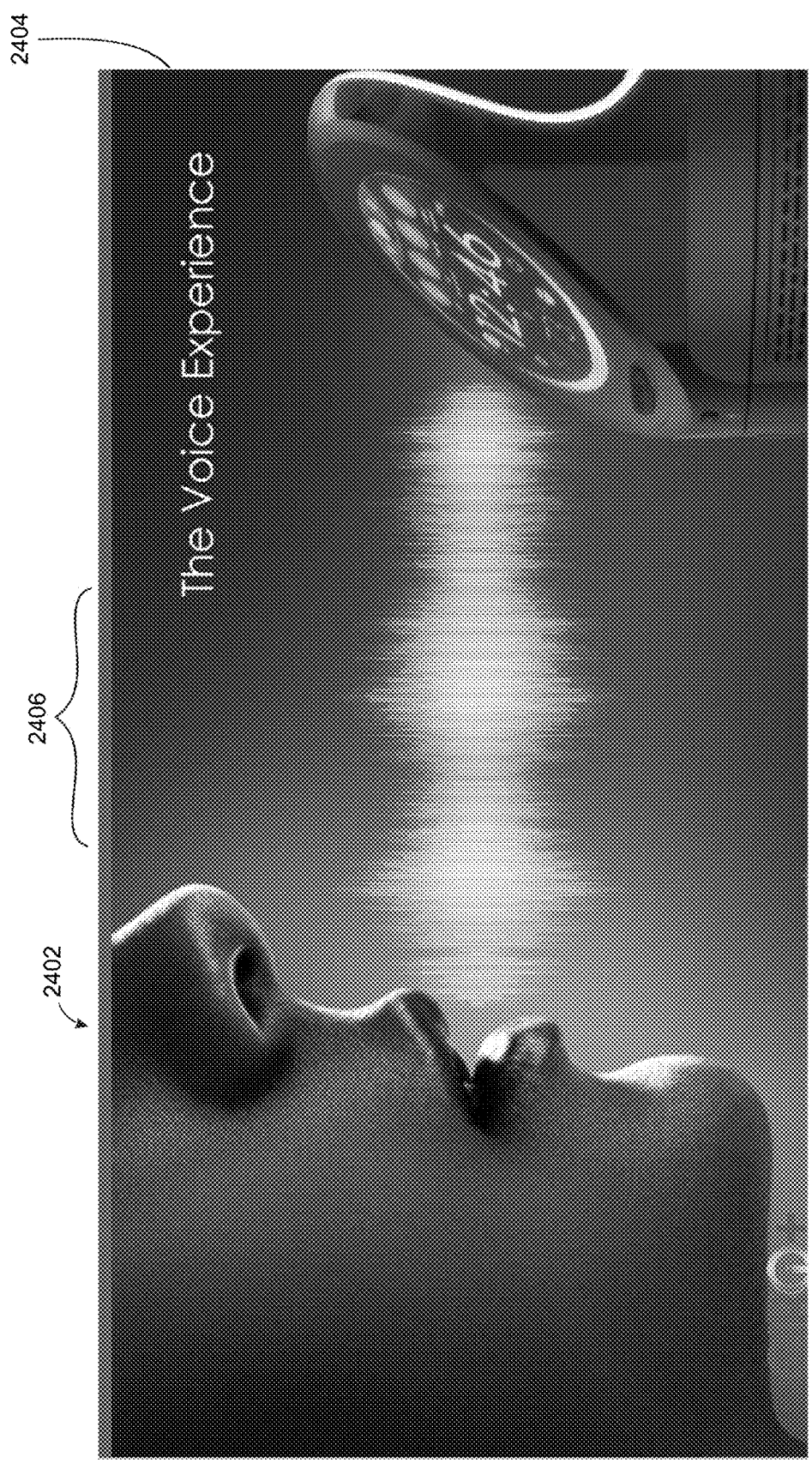
FIG. 24 is a detailed view of the display screen illustrating human and/or synthesized voice interaction with a hotel guest in accordance with various embodiments.

FIG. 24 is a close-up view of a voice interaction event 2400 involving a hotel guest 2402 and a display screen 2404, illustrating human and/or synthesized voice communication.

Refereeing now to FIGS. 25-29, an exemplary use case involving the synchronization of a digital mouth with packet of synthesized speech (e.g., a spoken word) will now be described.

Figure 25:
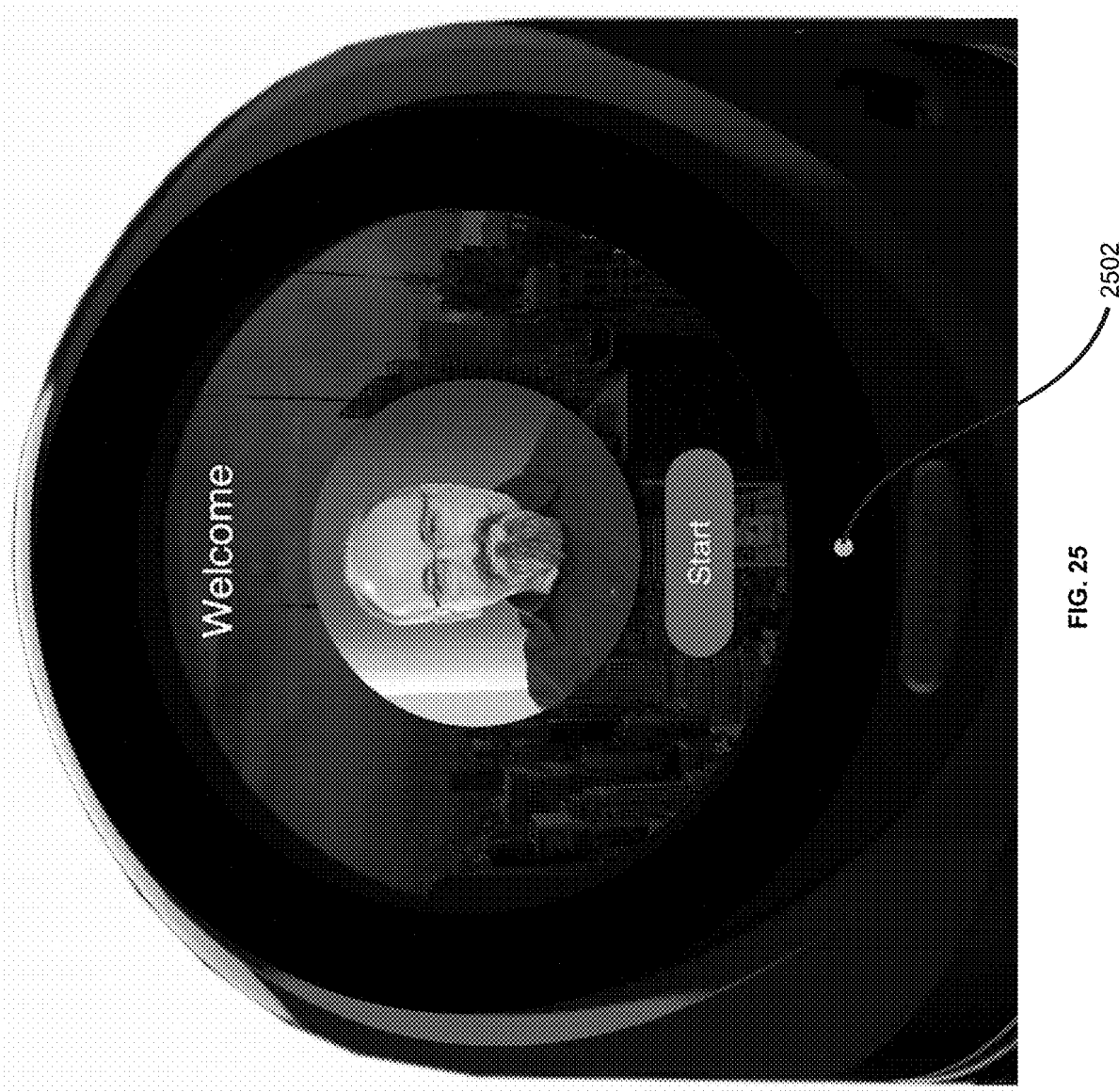
FIG. 25 is a schematic view of an anthropomorphic display depicting the mouth in the static (not speaking) position in accordance with various embodiments.

FIG. 25 is an anthropomorphic display depicting an exemplary mouth 2502 in the static (not speaking) position. This mouth expression may be employed when the device is not "speaking."

Figure 26:
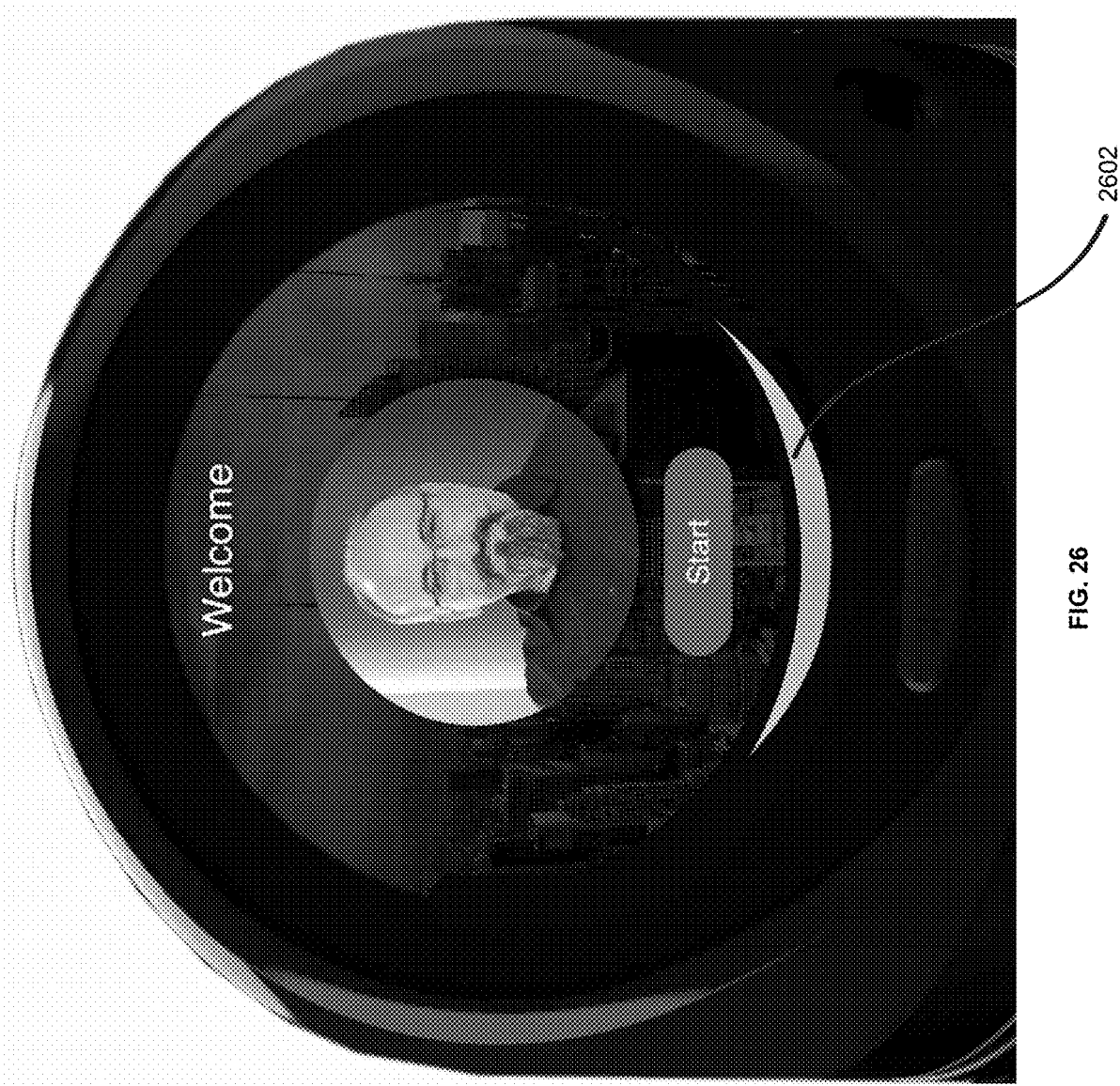
FIG. 26 is a schematic view of an anthropomorphic display depicting the mouth beginning to expand laterally while preparing to speak in accordance with various embodiments.

FIG. 26 depicts a mouth 2602 beginning to expand (e.g., laterally) or otherwise presenting a visual indication alerting the user that the device is preparing to speak.

FIG. 27 depicts a mouth 2702 fully extended or otherwise positioned to indicate that the digital mouth is just about to begin articulating a spoken word.

FIG. 28 depicts a mouth 2802 with lips narrowly parted or otherwise positioned to indicate initial commencement of speech. This position may be used to coincide with the initial audible perception of the synthesized speech.

FIG. 29 depicts a mouth 29 with lips widely parted or otherwise configured to indicate termination of a speech packet. This visualization may be used to coincide with the end of the audible segment of a spoken word.

In this way, the user simultaneously receives both visual and aural indicia of the display "speaking," providing for a more intimate and robust user experience.

In other embodiments the term "CIRQ" or other term may represent a default custom call word for hotel and resort applications.

In other embodiments the resort (e.g., front desk) can use the control modules to broadcast messages (e.g., active shooter or other customized messages, notifications, alerts, instructions, warnings, or other emergencies or priority notices) to all rooms on or off the premises, a subset of rooms based on guest profiles or demographics (e.g., all convention participants), a particular wing or building, or the like.

Recognizing that even when a device is "off," it may still be listening for an "on" or "listen" command, the control module may include a manually slidable, disengageable, or otherwise configurable button or mechanical feature to physically disconnect the voice processor, microphones, sensors and other associated components thereby electrically unplugging and deenergizing the voice capture hardware to ensure guest privacy and data security.

Other embodiments contemplate employee wearable panic button modules which may be Bluetooth or WIFI connected to beacons positioned within the hotel property or used through the employee's mobile phone. The system may be configured to track employees and to alert emergency personnel if an employee is assaulted or otherwise in need of assistance while on property. Accelerometers may be incorporated into the panic button module to detect a fall, and record audio if triggered. The panic signal emitted by the panic module can be detected by beacons located throughout the property, and a geo-fence violation broadcast when someone leaves the property. In one embodiment, the panic button communicates with the CIRQ device; in other embodiments the panic buttons communicate with beacons located around the property.

Occupancy sensors and/or voice recognition systems may be employed keep track of all people in the room, permitting the control module to engage in multi-party conversations, or plural single party exchanges.

Other embodiments contemplate fragrance pods (e.g., tied to a cloud based control system) located in guest quarters, meeting rooms, and other guest areas. The pods may be configured to dispense predetermined fragrances selected by the hotel or the guest. The scent can also be subliminal, to enhance the mood and personification of the display screen, e.g., using aromatherapy, essential oils, popular food items, ocean breeze, rain forest, and the like.

A hotel room internet-of-things (IOT) controller is thus provided which includes: a base module configured for table-top mounting; a control system operable by a guest in the hotel room to wirelessly control temperature, music, and lighting: and a touch interactive screen extending above the base module, the screen including a digital representation of a mouth; wherein movement of the mouth is synchronized to synthesized speech spoken through a speaker associated with the controller.

In an embodiment, the screen comprises a substantially circular display.

In an embodiment, the base module display comprises a cylindrically shaped body having a top circumference and a vertical axis; and the screen is mounted proximate the top circumference.

In an embodiment, the screen is tilted at a predetermined angle relative to a plane orthogonal to the horizontal axis.

In various embodiments, the angle is about 30 to 90 degrees, and preferably about 45 to 60 degrees, and most preferably about 56 degrees, but can be adjustable beyond 90 vertically based on guest resting in bed for optimal viewing angles.

In an embodiment, the controller includes a snooze button, a lamp, and an occupancy sensor.

In an embodiment, the controller further includes a microphone for detecting guest voice commands, and a speaker for playing synthesized speech responsive to the voice commands.

In an embodiment, the digital mouth includes top and bottom lips, and the controller is configured to display the digital mouth: i) in a rest position when the controller is silent; ii) in a partially expanded position when the controller is preparing to speak; iii) in a fully expanded position with lips partially spaced apart when the controller begins speaking; and iv) in a fully expanded position with lips fully spaced apart when the controller finishes speaking.

In various embodiments, the top lip moves relative to the bottom lip; the bottom lip moves relative to the top lip; and/or the top and bottom lips each move relative to each other.

In an embodiment, the controller further includes an emoji database from which expressions are retrieved and integrated into the mouth during synthesized speech.

A method is also provided for enhancing engagement between a hotel room guest and an internet-of-things (IOT) controller of the type including a base module having a speaker and configured for table-top mounting, a control system operable by a guest in the hotel room to control the room environment, and a touch interactive screen extending above the base module. The method includes the steps of: displaying a digital representation of a mouth on the screen; and synchronizing movement of the mouth with synthesized speech played through the speaker.

In an embodiment, the digital mouth includes top and bottom lips, and the step of synchronizing comprises displaying the digital mouth: i) in a partially expanded position when the controller is preparing to play synthesized speech; ii) in a fully expanded position with lips partially spaced apart when the controller begins synthesized speech; and iii) in a fully expanded position with lips fully spaced apart when the controller completes synthesized speech speaking.

In an embodiment, the step of synchronizing further includes at least one of: i) moving the top lip relative to the bottom lip; ii) moving the bottom lip relative to the top lip; and iii) moving both lips.

In an embodiment, the method further includes: providing the IOT controller with access to an emoji database; retrieving an emoji expression from the database; and integrating the emoji expression into the mouth during synthesized speech.

In an embodiment, the method further includes: using artificial intelligence to determine the guest's mood; and adjusting an attribute of the synchronized mouth movement to adapt to the guest's mood.

In an embodiment, the method further includes adjusting an attribute of the synthesized speech to adapt to the guest's mood.

Referring now to FIGS. 1-16, presently known mobile apps for controlling IOT devices offer a limited value proposition to the user, and are typically limited to consolidating multiple end point assets (e.g., lighting, door locks, HVAC) into a connected central guest room hub. In contrast, the present system offers a more robust value proposition to the guest user in the form of enhanced control of the user experience, amenity upgrades, rewards, personalization preferences and targeted/push marketing messages, offers and notices as well as enabling features (both on and off property) that would otherwise be unavailable without location services enabled.

Various embodiments contemplate monitoring the guest's location using the guest's mobile phone, wearable accessory, laptop, or any other GPS or location-enabled device. In this way, location aware (and hence context aware) features and services may be pushed to the guest in new and imaginative ways heretofore not contemplated by existing systems. Moreover, by incenting the guest to keep location services enabled even when the guest is off the hotel property, valuable tracking information may be collected, mined, and harvested to design precisely designed marketing messages delivered with pinpoint accuracy. An additional benefit of collecting aggregate location data surrounds the ability to conduct advanced analytics, and to offer customized guest benefits with guest room and property wide preferences based on these analytics.

From an enterprise standpoint, the system contemplates at least the following levels of value proposition: i) allowing the property to offer guests the ability to control and manage a plurality of IOT devices in the room using a mobile app, with low hardware and installation costs; ii) wirelessly controlling room temperature through a controller mounted within a bedside module; iii) thermal mapping and motion mapping using multiple sensors within a guest room to monitor occupancy through presence or respiration; iv) promoting conservation through gamification coupled with a loyalty rewards component; v) providing the guest with perks and other features which leverage location services (tracking); vi) mining the resulting aggregate location data facilitates the development of enhanced targeted marketing programs; and vii) allowing the hotel property the ability to substantially reduce power and water usage within each room, viii) the ability to migrate personal environmental and personal preferences from property to property.

The value proposition to the guest includes providing enhanced information to the mobile device thru the mobile app regarding the environment within and outside the room on their personal devices or in another functional use having the app running on the central hub. In various embodiments, this involves a cloud based system server (sometimes referred to herein as the CIRQ server) operating within the broader internet environment to thereby integrate the immediate environment (guest room) with the extended environment (the resort property, nearby attractions, and remote attractions).

In various embodiments, the in-room IOT control module is used to drive initial user engagement including operating a version of the mobile app and enabling guest connectivity and services, whereupon the resulting location awareness (tracking) may be used to drive further user engagement (e.g., on and off property perks, targeted and push marketing). Aggregate tracking data from multiple users may then be mined and harnessed to drive further targeted marketing notices, offers, messages, schemes, energy savings, and to analyze travel and spending trends. Indeed, the intersection among the PaaS System with in-room IOT control and location awareness alone has significant value in terms of energy savings for the property owner, as described below.

In addition, the system may be configured to gather performance data for the IOT devices and appliances, failure modes and trends, lifetime usage, servicing cycles/predictions and duty cycles in multiple geographic locations to thereby reduce long term total cost of use, increasing revenue/profit for the PaaS System and driving capital equipment replacement and upgrade timetables for property owners.

Figure 1:
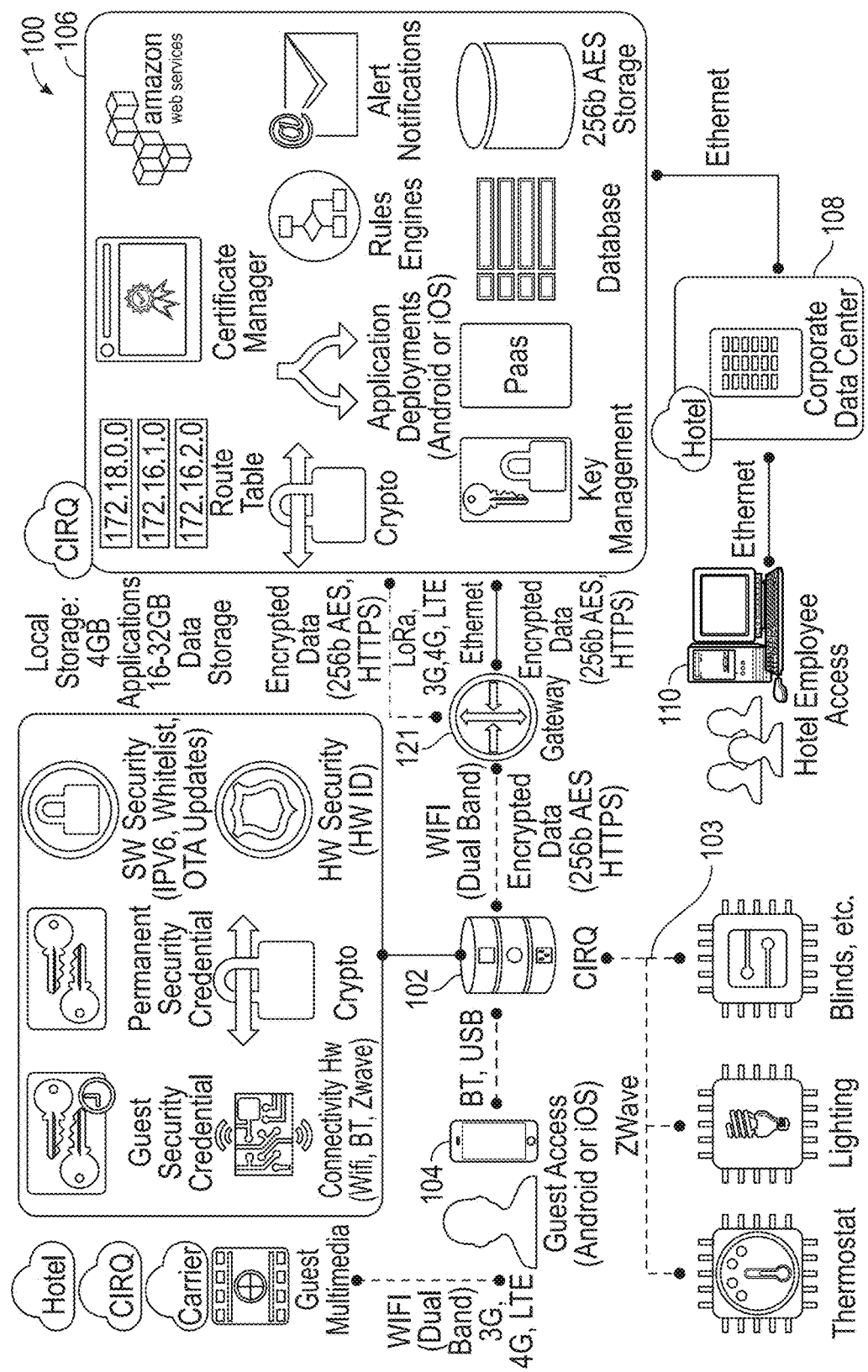
FIG. 1 is a schematic diagram of an enterprise level system for providing enhanced and engaging customization to the guest experience using a PaaS System with an in-room IOT module and an associated mobile app (or embedded system app and associated user interface) and API both configured to augment tracking data with contextual awareness in accordance with various embodiments.

Turning now to FIG. 1, a system 100 for providing enhanced customization to a guest experience includes an in-room IOT module 102 for controlling a local IOT network 103, an associated mobile app running on a guest mobile device 104, an enterprise server 106 including a PaaS platform, and a property owner server 108 configured to communicate with a facilities controller 110.

More particularly, the IOT module 102 is configured to communicate with the guest device 104 using Wi-Fi, Bluetooth, wired or wireless Ethernet, VPN, USB, Zigbee, Z-Wave, cellular (3G, 4G), or any radio bands other suitable wired or wireless protocol. The IOT module 102 is configured to communicate with the devices which comprise the IOT network 103 using ZWave, Bluetooth, or any suitable wired or wireless protocol. The IOT module 102 is configured to communicate with the enterprise server 106 through a gateway 121 (such as the internet) using Wi-Fi, LoRa, 3G, 4G, LTE, Ethernet, radio or any suitable wired or wireless protocol. Similarly, the enterprise server 106 is configured to communicate with the property owner server 108 using Wi-Fi, LoRa, 3G, 4G, LTE, Ethernet, radio or any suitable wired or wireless protocol.

In a typical use case, the guest device 104 communicates directly with the IOT module 102 when the guest device 104 is inside or otherwise closely proximate the hotel room. When the guest is outside the hotel room, off the hotel premises, or otherwise out of range of the IOT module 102, the guest device 104 communicates directly with the enterprise server 106 using a cellular network (e.g., 3G, 4G, LTE) radio or through a suitable wired or wireless internet connection.

Figure 2:
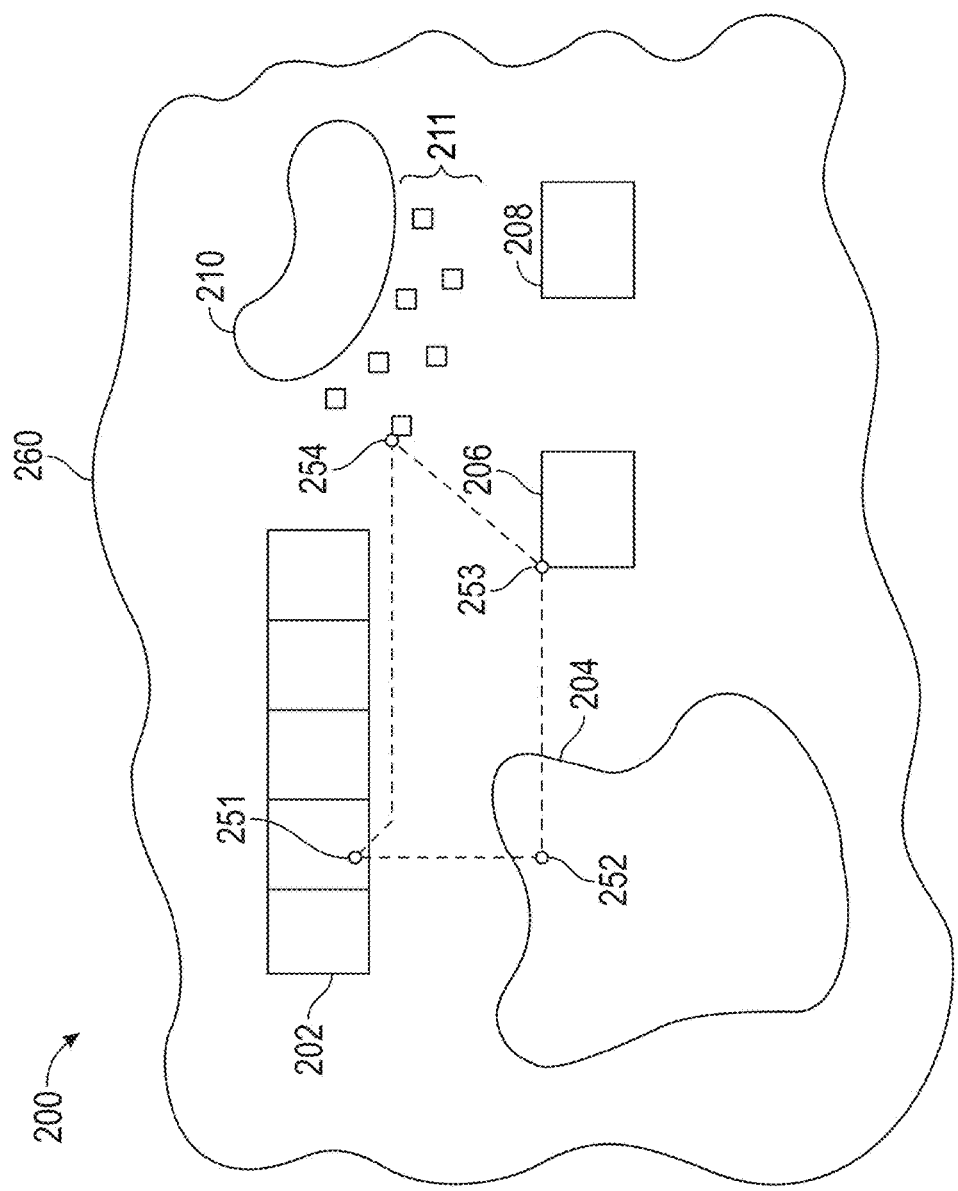
FIG. 2 is a schematic diagram of a hotel property illustrating tracking data for a hotel guest within the boundary of the hotel property in accordance with various embodiments.

FIG. 2 is a schematic diagram of a hotel property 200 illustrating tracking data for a hotel guest within the boundary of the hotel property. In the illustrated example, the mobile app tracks the guest's movement from a guest room 202 (point 251), to golf course (point 252), to a restaurant 206 (point 253), to a particular one of a plurality of cabanas 211 adjacent a pool 210 (point 254), and back to the room (point 251). A geo-fence 260 defines the boundary of the hotel, resort, or time share property.

Figure 3:
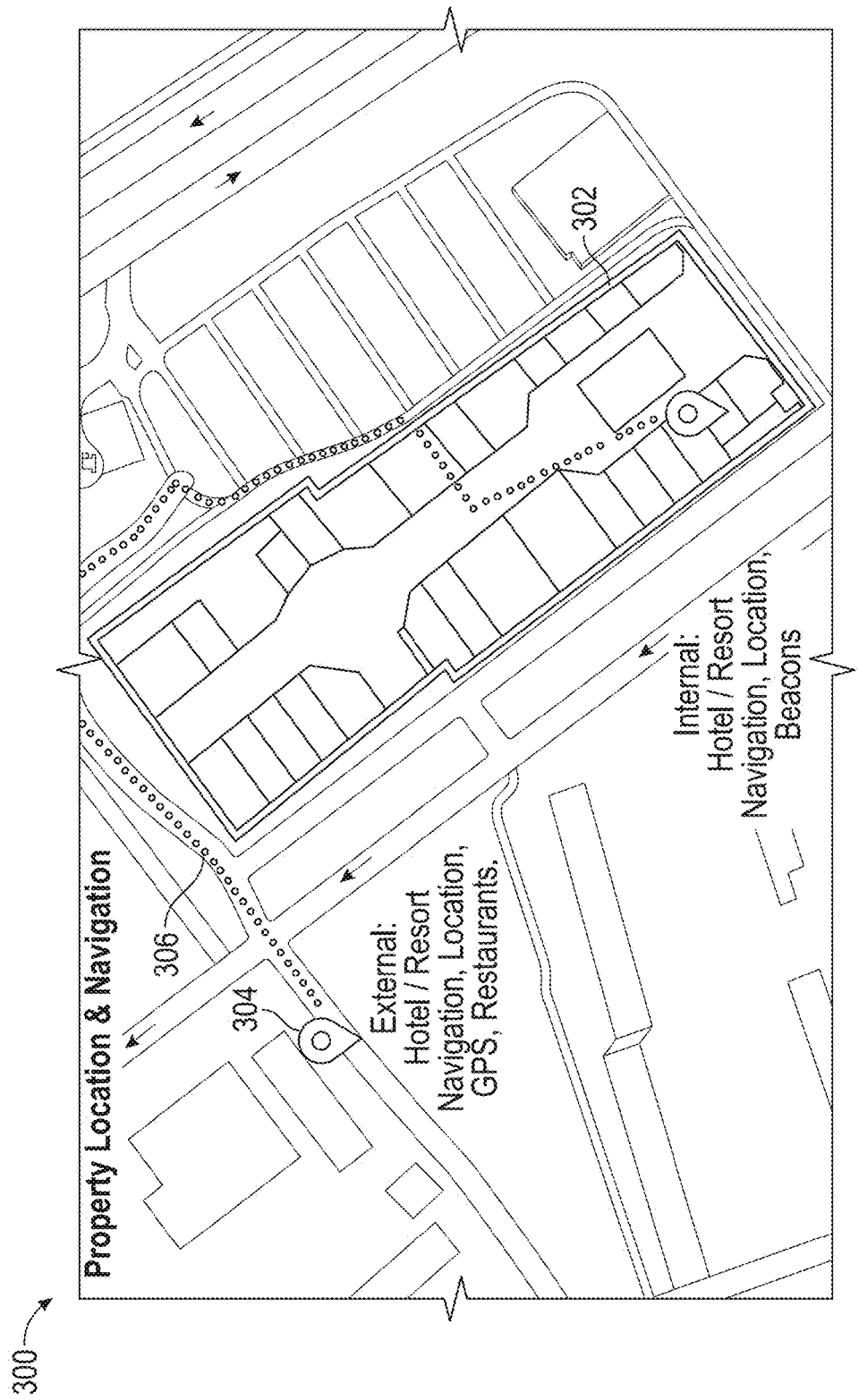
FIG. 3 is a schematic diagram illustrating tracking data for a hotel guest within and outside the boundary of the hotel property with cellular or area Wi-Fi in accordance with various embodiments.

FIG. 3 is a schematic diagram illustrating tracking data 306 for a hotel guest within and outside the boundary 302 of a hotel property as the guest visits an off premises location 304 (tourist attraction, restaurant, office, theater, or the like).

Figure 4:
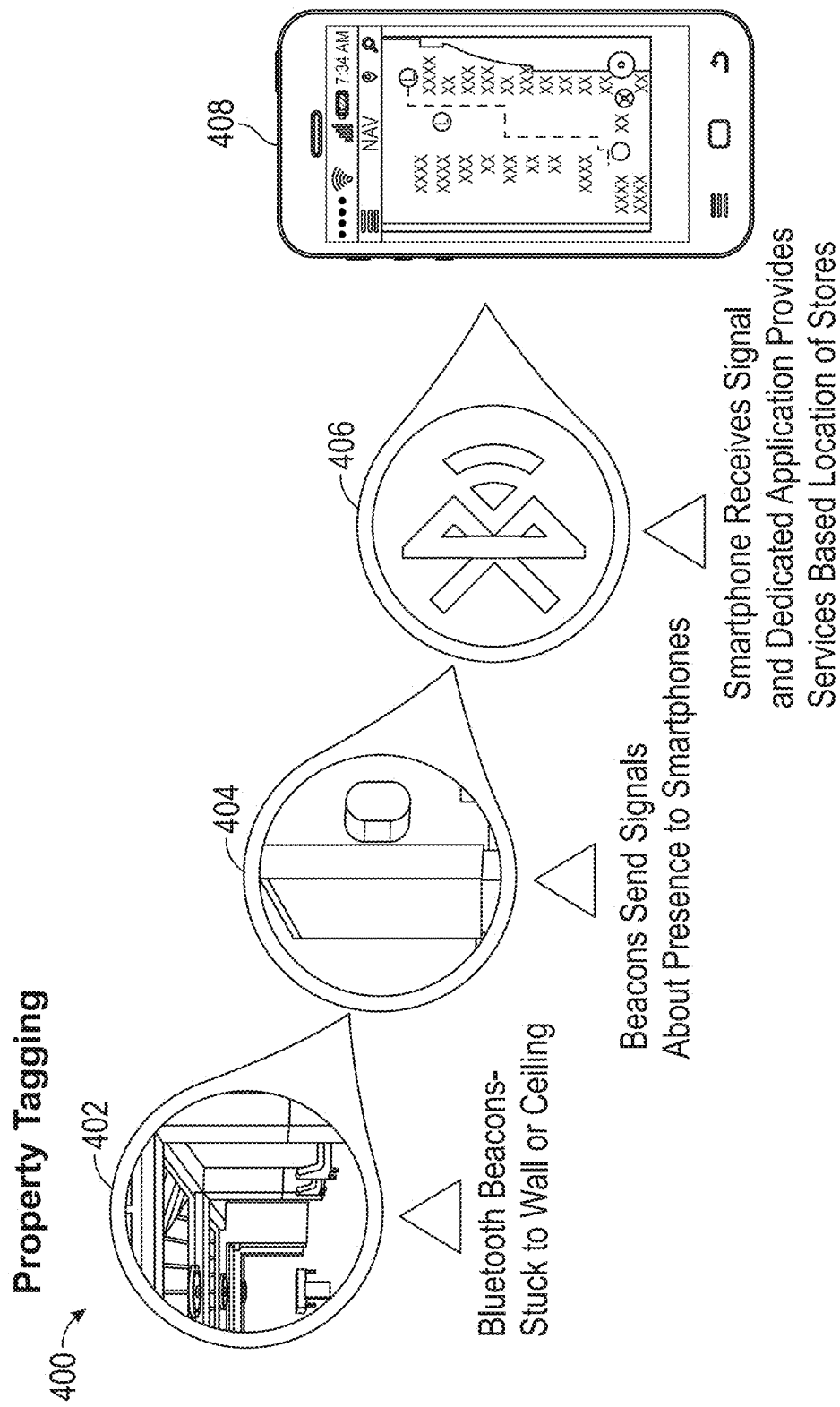
FIG. 4 is a schematic diagram illustrating the use of beacons in addition to and/or in lieu of traditional GPS based location services in accordance with various embodiments.

FIG. 4 is a schematic diagram illustrating the use of beacons in addition to and/or in lieu of traditional GPS based location services. More particularly, FIG. 4 depicts a hallway 402 including wall mounted beacons or embedded building or infrastructure sensors. Each beacon 404 is configured to send static location information to the mobile app using Bluetooth or similar protocols 406. In this way, even without enabling location services, the mobile app can display the locations of various hotel amenities on the mobile device screen 408.

Figure 5:
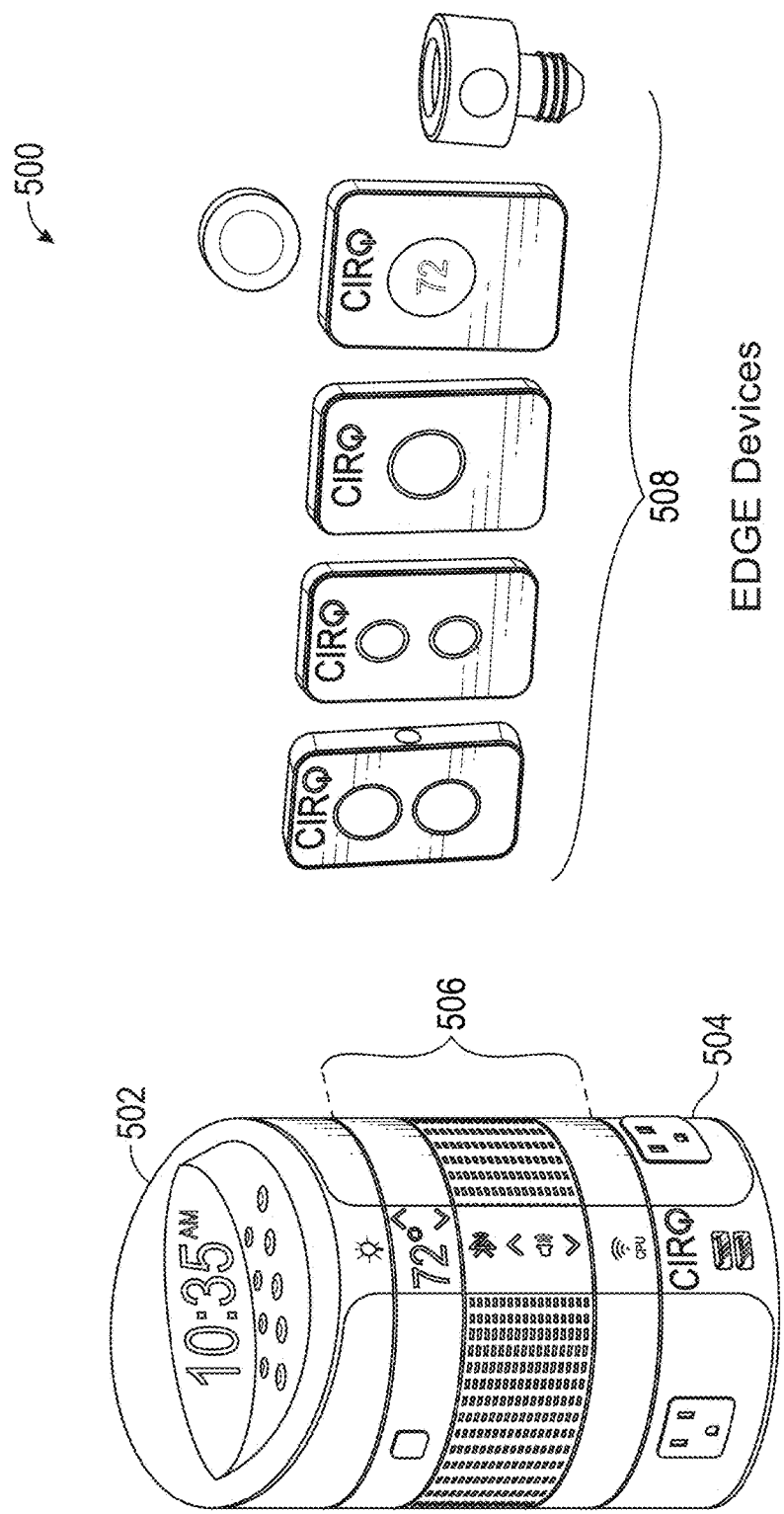
FIG. 5 is a schematic diagram of an exemplary in room TOT network that is part of a unified PaaS system including a base module and a plurality of edge devices in accordance with various embodiments.

Referring now to FIGS. 1 and 5, an exemplary PaaS system with an in-room IOT network system controller 500 includes a control module 502 and a plurality of IOT devices (referred to herein as Edge devices) 508. In particular, the control module 502 includes a base 504 and a plurality of stacked electronic modules 506, each of which is configured to communicate with, monitor, and/or control one or more of the edge devices.

Figure 6:
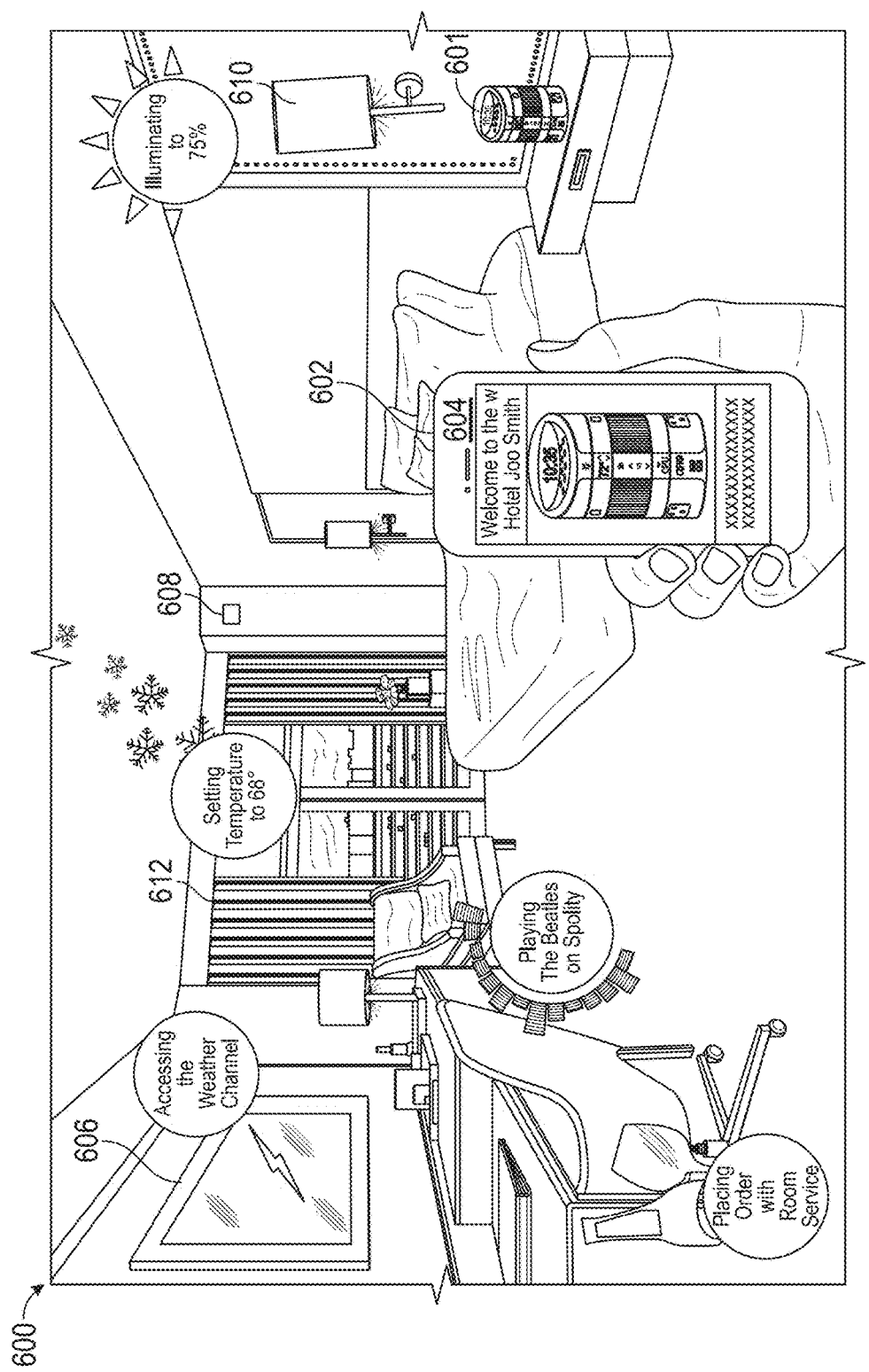
FIG. 6 is a schematic diagram illustrating a mobile app operating on a mobile device and controlling a plurality of IOT devices in accordance with various embodiments.

FIG. 6 is a schematic diagram illustrating a mobile device 602 operating a mobile app 604 for controlling an IOT module 601 which, in turn, coordinates a plurality of IOT devices such as, for example, an entertainment system (e.g., television) 606, a thermostat or other HVAC controller 608, lighting 61o, motorized window coverings 612, and a services module 614 for coordinating resort amenities (e.g., room service, reservations for local restaurants and tourist attractions).

Figure 7:
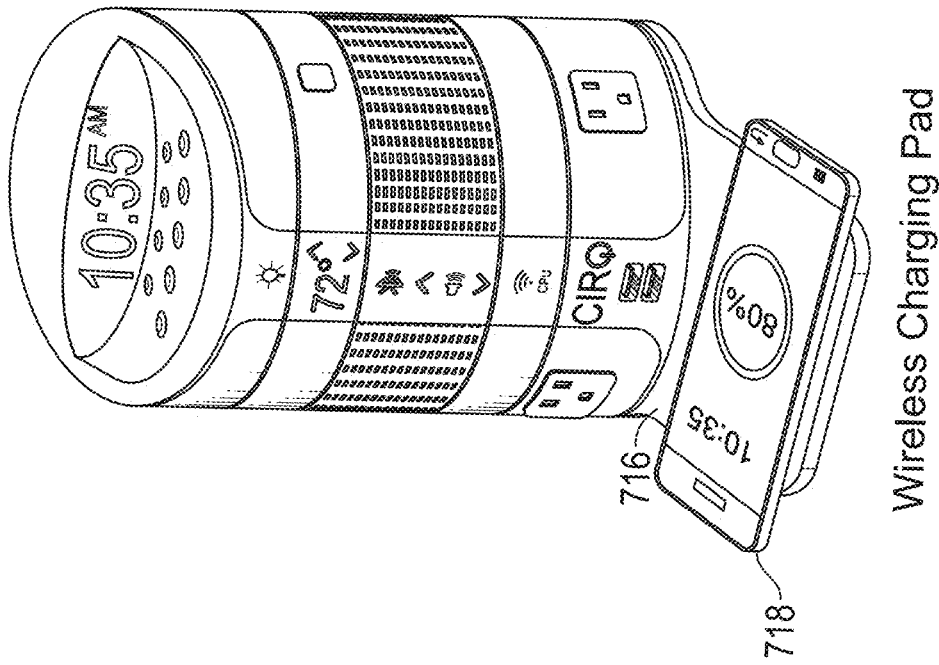
FIG. 7 is a more detailed view of the base module in accordance with various embodiments.
Figure 7:
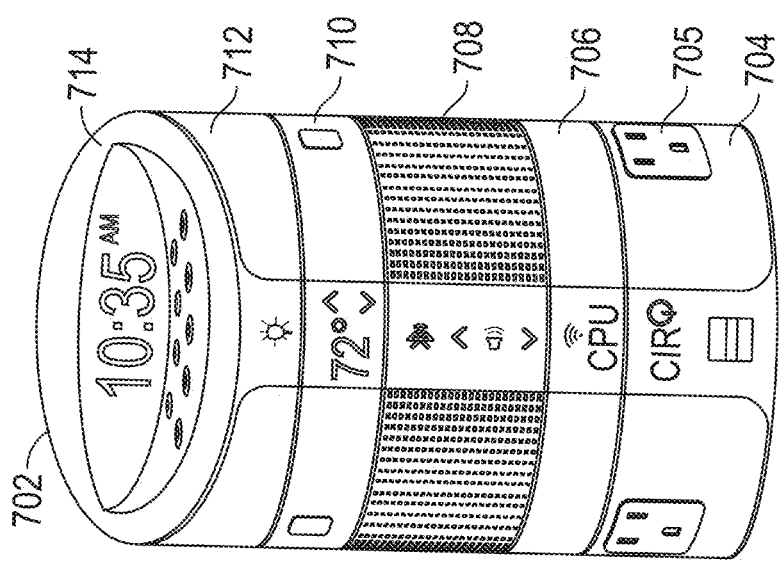

FIG. 7 is a more detailed view of an exemplary IOT control module 702 including a base 704 having one or more female AC adapters 705, and a CPU module 706 including a Wi-Fi component, a ZigBee Multi-Band IoT Mesh Network Technology component, and/or a hard drive component. The control module 702 further includes an audio module 708 including a speaker and/or microphone component, a sensor module 710 including a remote thermostat module with thermo-sensors and ultrasonic sensors and motion and/or infrared sensor module, a smart LED module 712, and a utility module 714 including a digital alarm clock, a radio, and an optional mobile docking/charging station. An alternative embodiment of a mobile docking/charging station 716 is shown charging a smart phone 718. In this regard, the sensor module 710 may also include one or more radar antennas in the head unit configured to triangulate with the relay radar antenna to facilitate occupancy detection.

Figure 8:
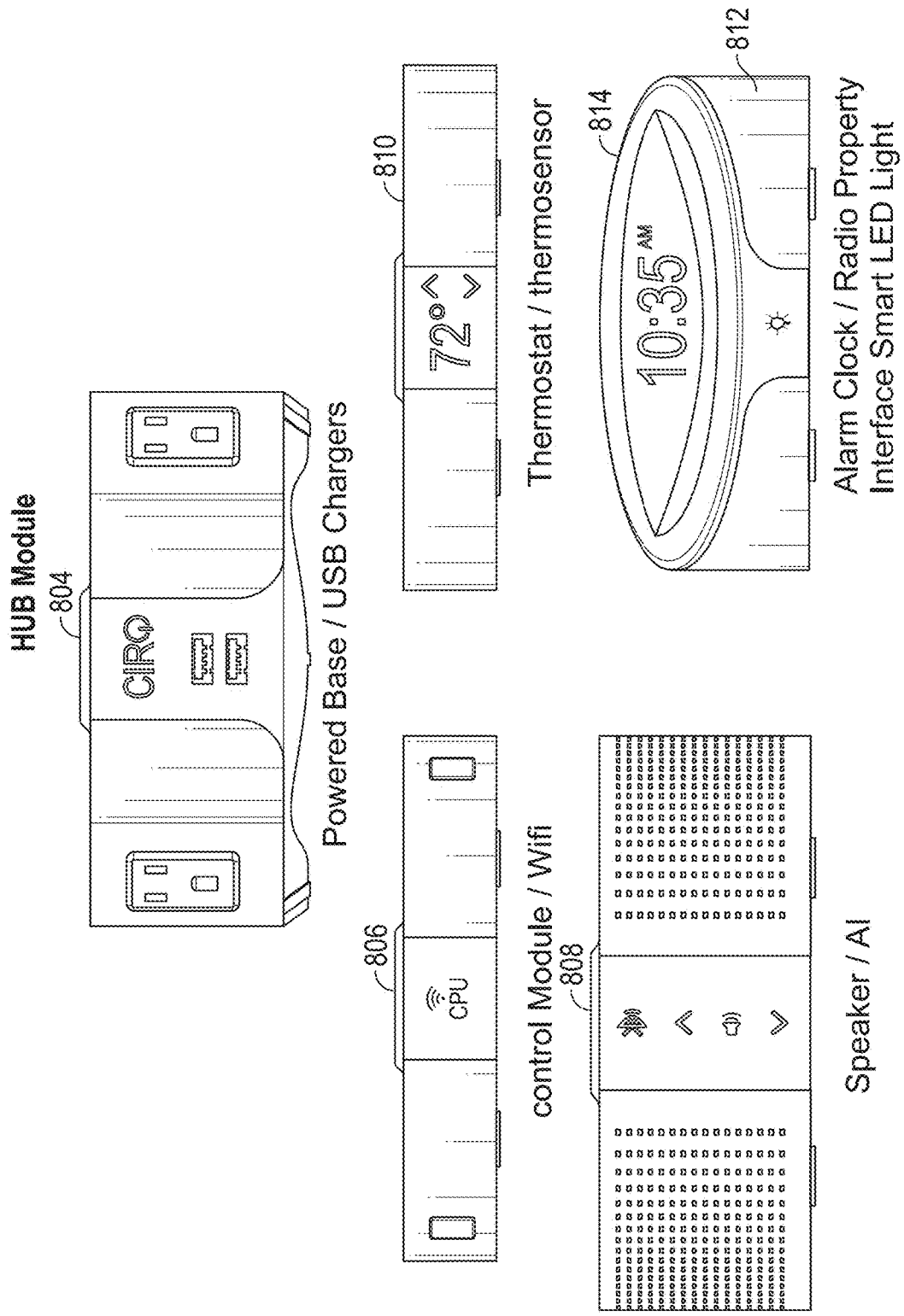
FIG. 8 is a schematic view of the stackable electronic hub modules shown in FIG. 7 in accordance with various embodiments.

FIG. 8 is a schematic view of the stackable electronic hub modules shown in FIG. 7, including a base module 804, a CPU module 806, an audio module 808, a remote thermostat and occupancy/thermo-sensor module 810, a lighting module 812, and a utility module 814.

Figure 9:
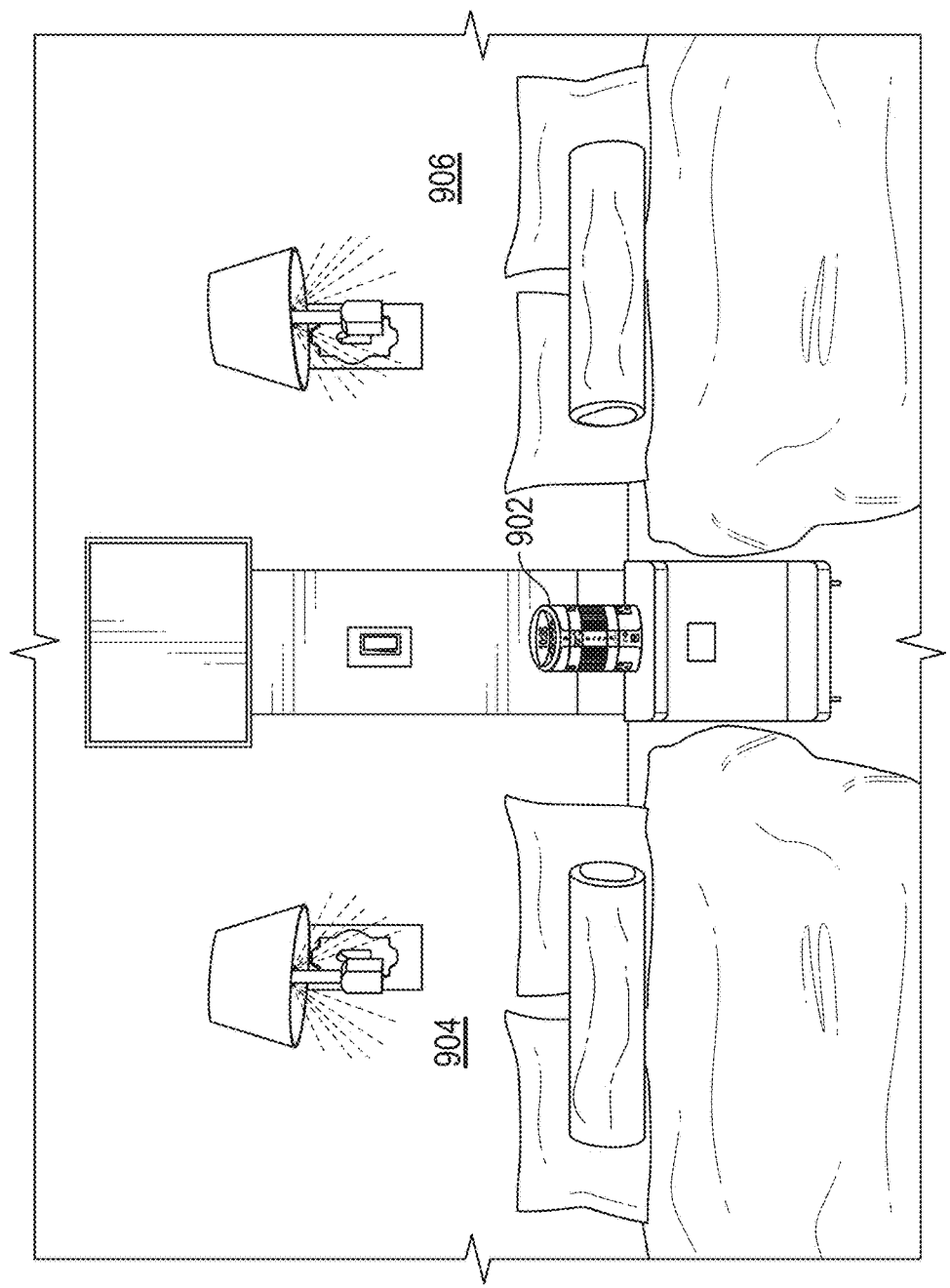
FIG. 9 is a schematic view of a base module disposed between two beds in a typical hotel, resort, or time share environment in accordance with various embodiments.

FIG. 9 is a schematic view of an IOT controller 902 disposed between a first bed 904 and a second bed 906 in a typical hotel, resort, or time share room environment. In the illustrated embodiment, the modular stack may include a remote relay to be used in the place of a traditional wall thermostat with the motion, radar, and/or infrared sensors (not shown) may be positioned so that full room coverage may be obtained using a minimum number of sensors (e.g., 2). Additionally by having the remote thermostat bedside the guest will be able to adjust the temperature controls on the remote thermostat and user interface and as well using the mobile app without leaving the bed.

Figure 10:
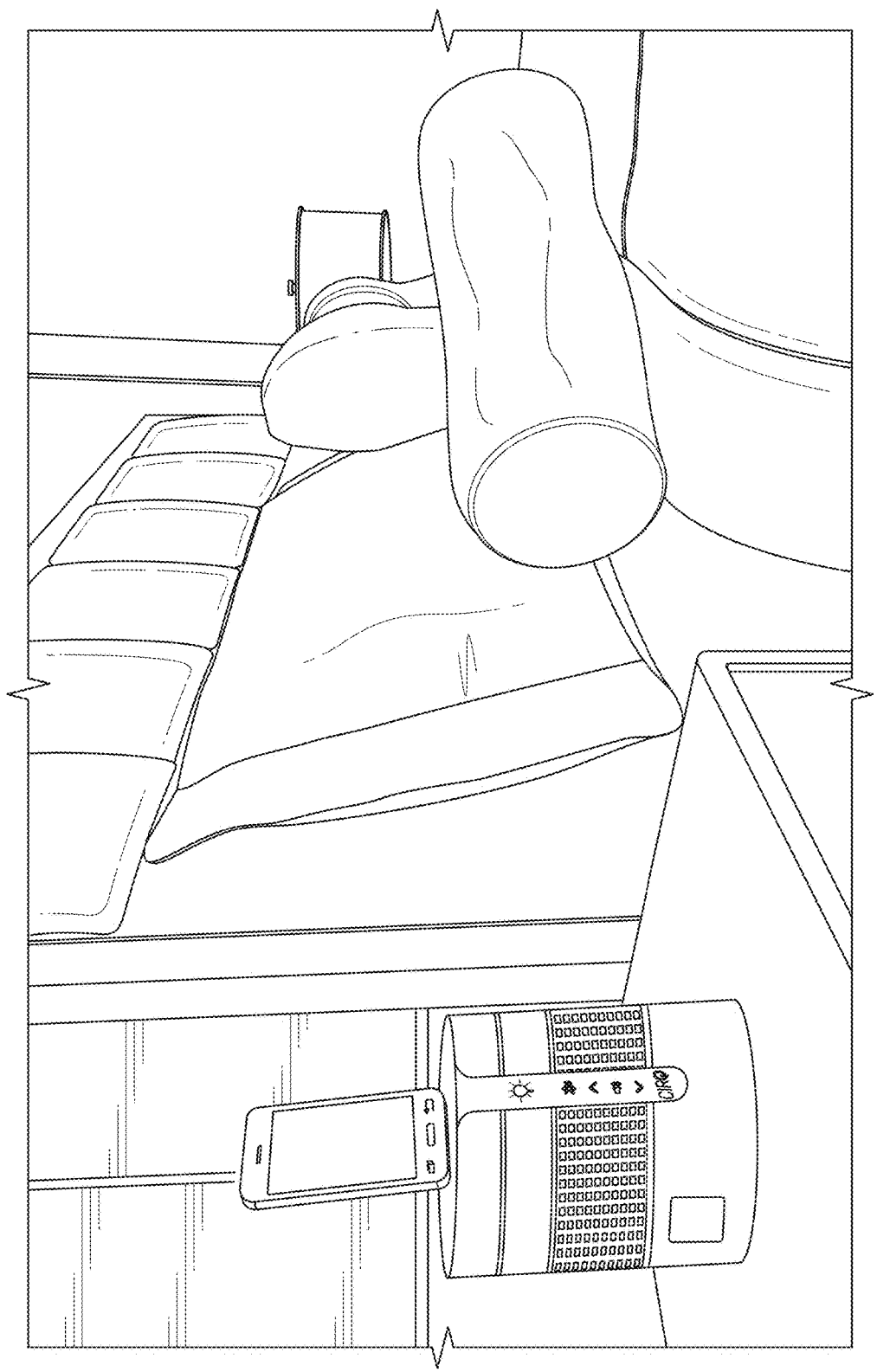
FIG. 10 is a schematic view of a base module disposed bedside, illustrating a smart phone charging station in accordance with various embodiments.

FIG. 10 is a schematic view of an alternative embodiment of an IOT control module disposed on a bedside table, illustrating a smart phone charging station on a top surface of the IOT control module.

Figure 11:
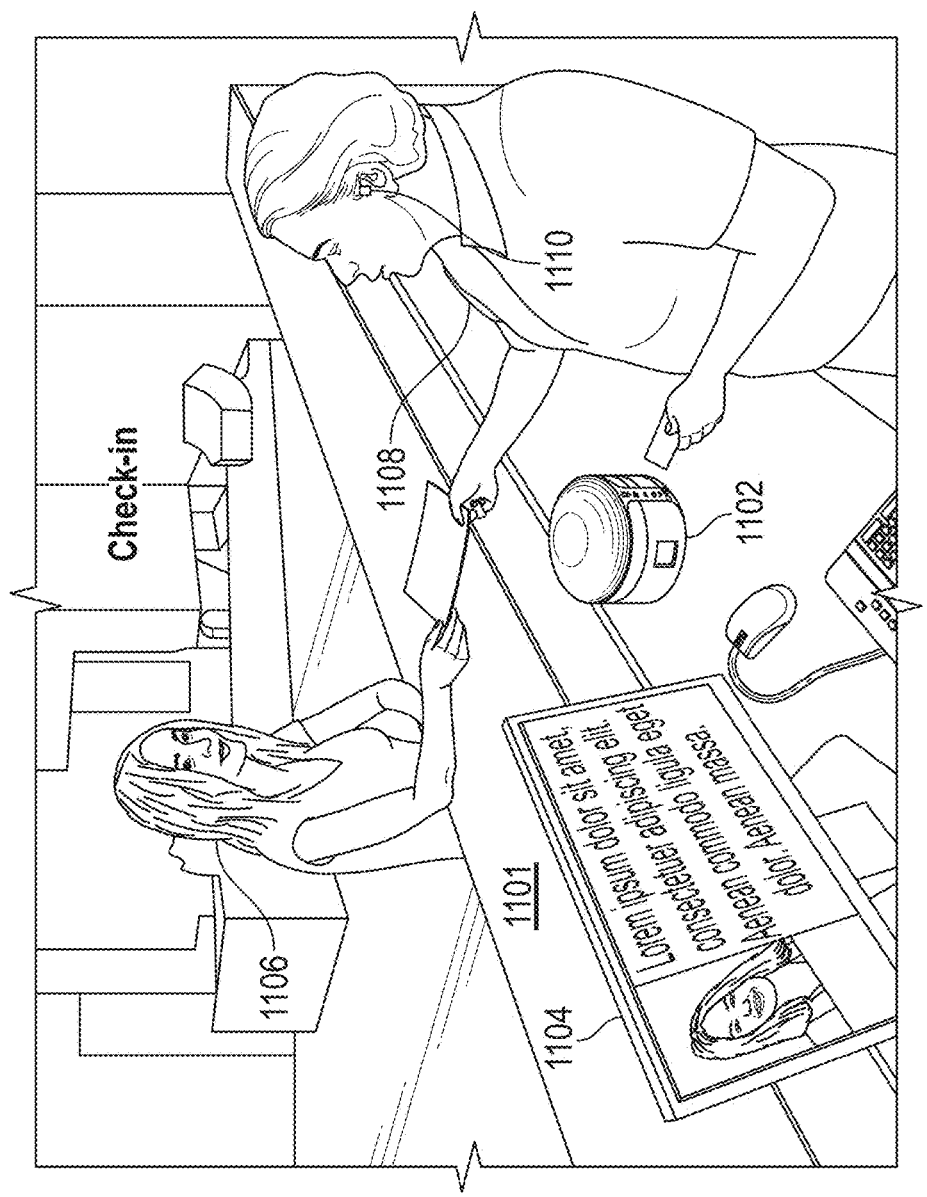
FIG. 11 is a schematic view of an alternative embodiment of a base module, illustrating a hotel employee addressing a guest by name based on real time location tracking in accordance with various embodiments delivering a more welcoming and personalized experience.

FIG. 11 is a schematic view of a front desk 1101 equipped with a base module 1102 configured to communicate with or embody a display 1104. In the illustrated embodiment, as a guest 1106 approaches a hotel employee 1108, the guest's location is tracked by the system, and the guest's name may be displayed on the screen 1104, or spoken to the employee through an ear piece 1110. In this way, the employee may address the guest by name using on real time location tracking data.

Figure 12:
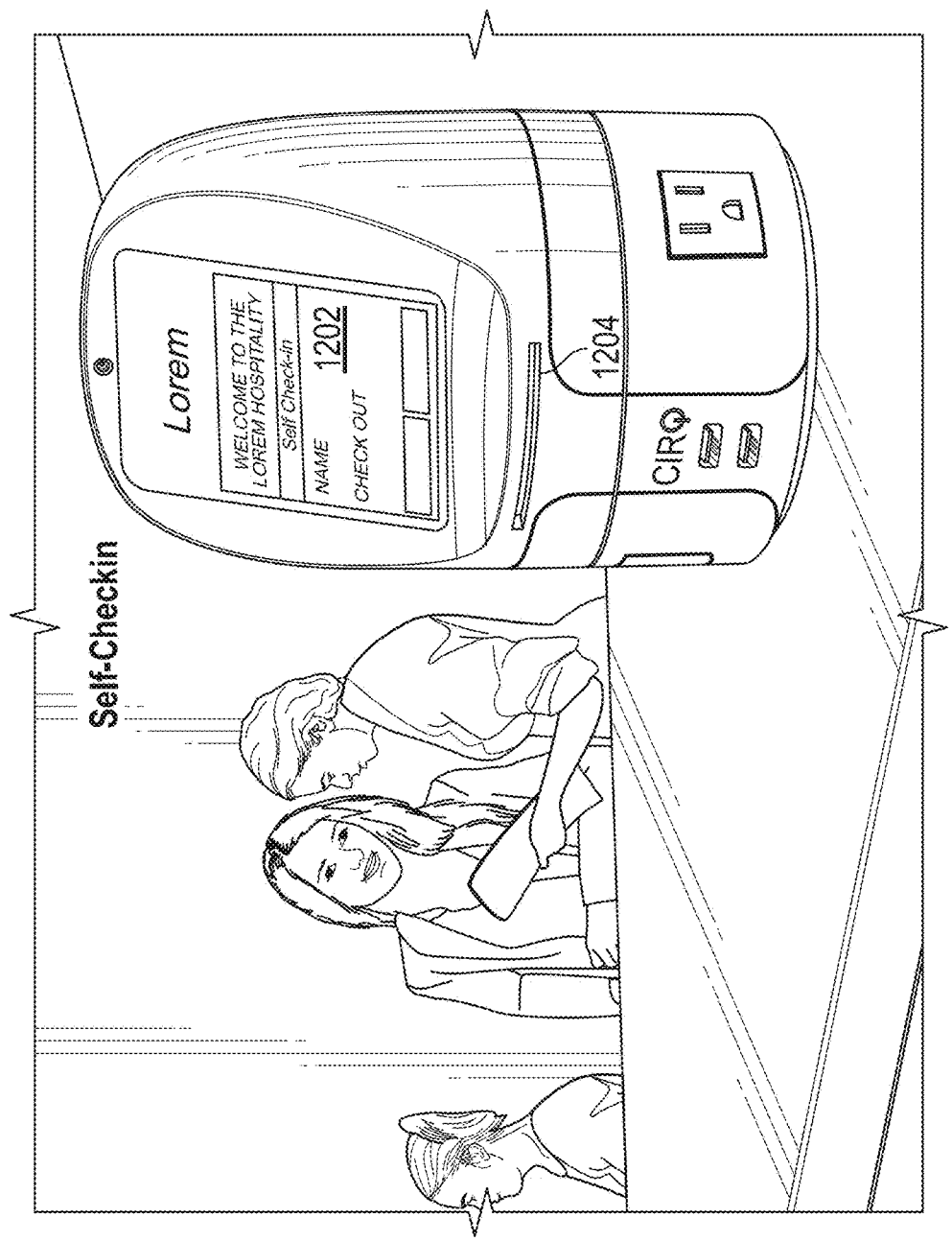
FIG. 12 is a schematic view of an alternative embodiment of a base module illustrating a self check-in and check-out system in accordance with various embodiments.

FIG. 12 is a schematic view of an alternative embodiment of a base module illustrating a self check-in and check-out module system allowing guests to perform self-registration, room upgrades and check-in into the property without having to directly interact with a property owner staff or employee, expediting their access to the purchased room. The illustrated embodiment includes a user interface, a display 1202, and a key card maker and credit card reader 1204.

Figure 13:
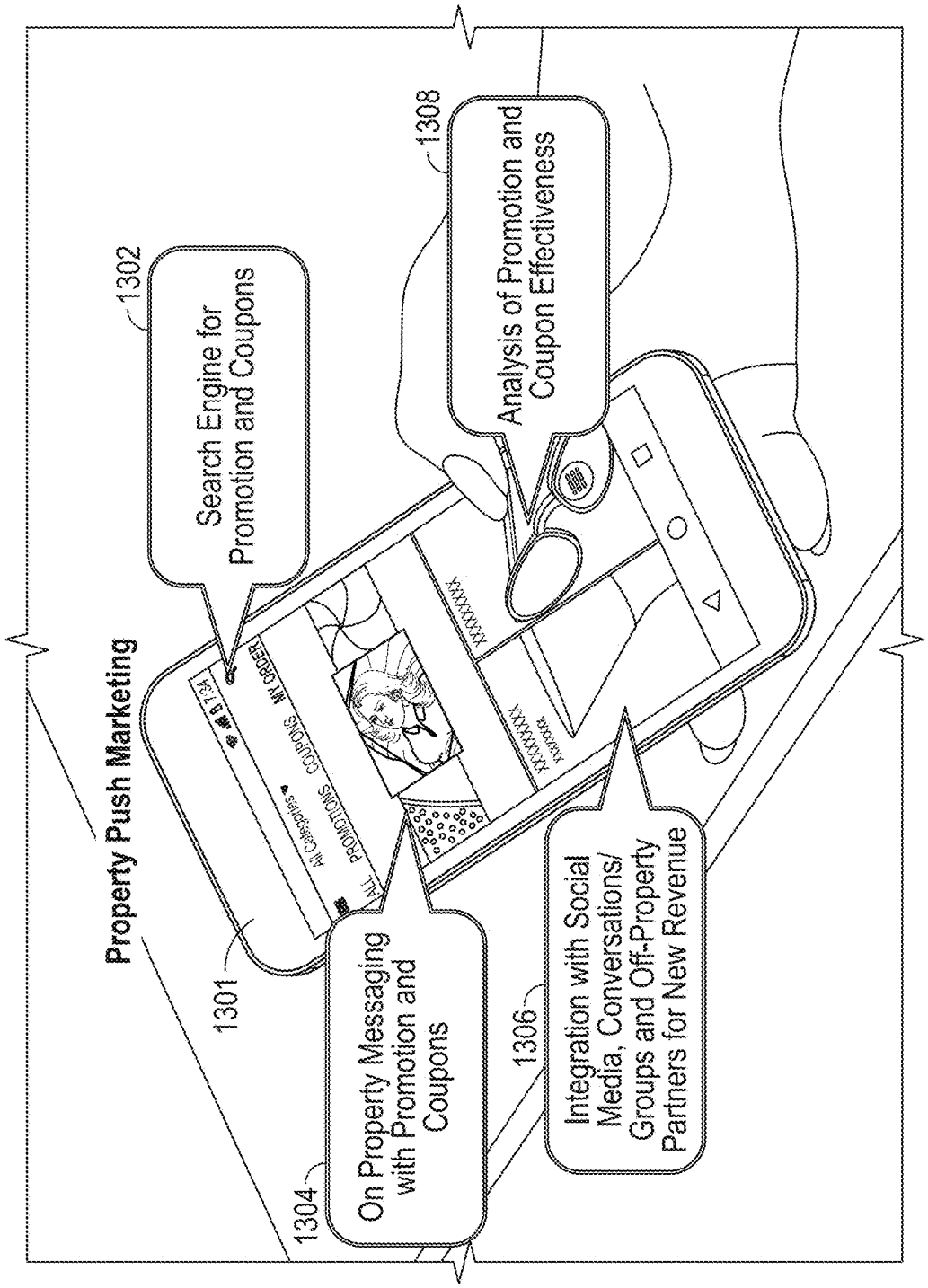
FIG. 13 is a screen display of a mobile app operating on a smart phone illustrating targeted marketing vectors in accordance with various embodiments.

FIG. 13 is an exemplary guest smart phone 1301 running a mobile app configured to display a property specific search feature 1302 for services, searching promotions, upgrades, and incentives, a proprietary (on property) messaging portal 1304 for receiving notices, offers, promotions and messages, an integrated social media portal 1306, and an analytics portal 1308. Alternatively, the foregoing functionality may be hosted locally or remotely, without the need for the guest to download a mobile app.

Various embodiments of the present invention remote thermostatic control of an in-room heating, ventilation, and air conditioning (HVAC) unit such as a packaged terminal air conditioner (PTAC). PTACs are typically single, commercial grade, self-contained units installed through or inside a wall or window of a hotel guest room. A PTAC's compressor system both cools and heats. To cool, the units compressor pumps refrigerant to cool the coils which attracts heat and humidity which is then exhausted to the outside. To heat, this functionality is reversed. The refrigerant is used to heat the coils, and when air passes over it the unit pushes the heated air into the room. PTACs are larger than a typical through-the-wall air conditioner and can be wired controlled through the relay or wireless controlled via the in-room hub.

Figure 14:
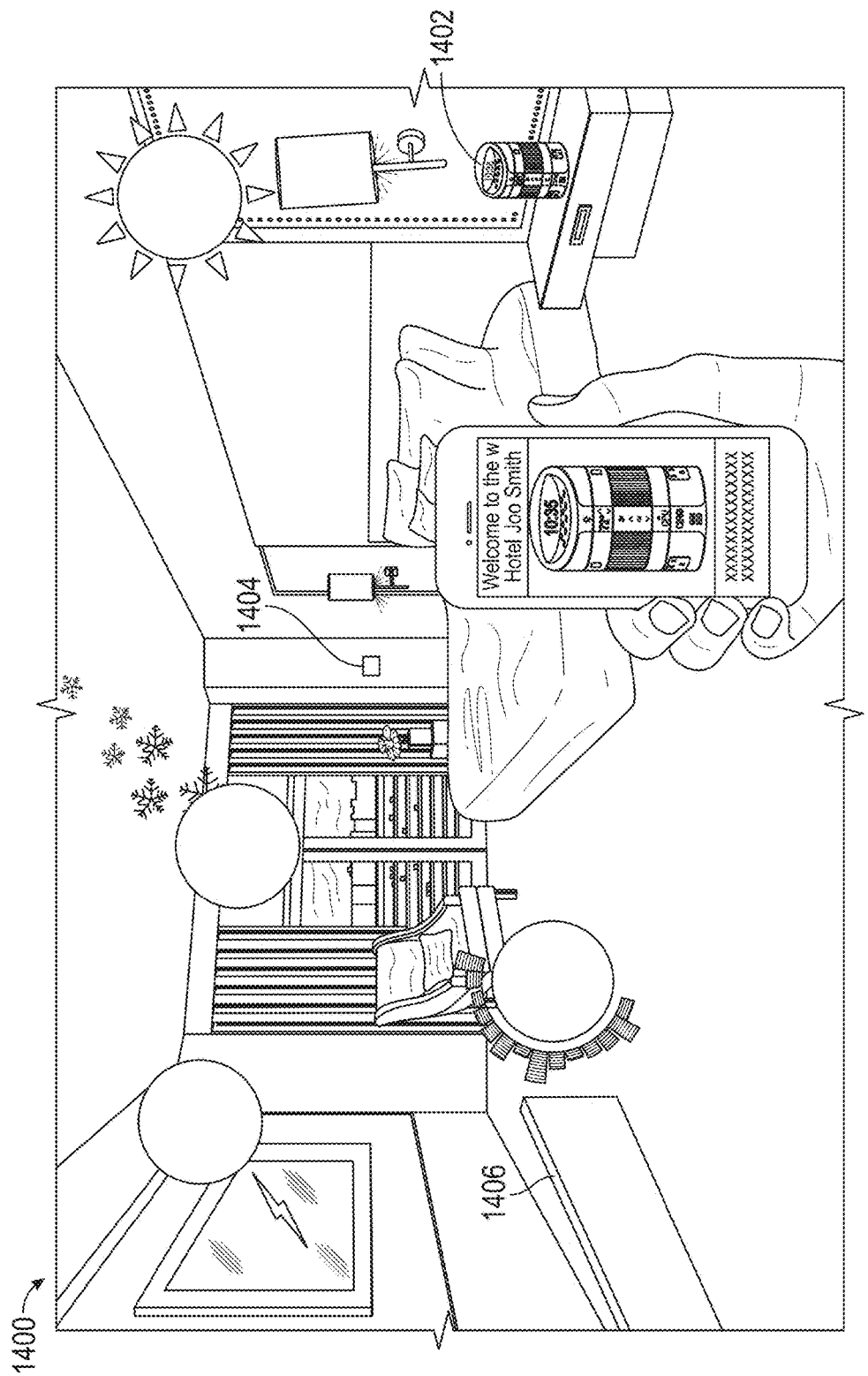
FIG. 14 is a schematic diagram of an in-room IOT module configured to wirelessly communicate with a relay which replaces a conventional wall-mounted thermostat to thereby control an in-room heating, ventilation, and air conditioning (HVAC) unit such as a packaged terminal air conditioner (PTAC) in accordance with various embodiments.

With continued reference to FIGS. 5-10 and also referring now to FIG. 14, a remote thermostatic control system 1400 includes an in-room IOT module 1402, a relay 1404 designed to replace a conventional wall-mounted thermostat (not shown), and an HVAC unit 1406 (e.g., a PTAC). In the illustrated embodiment, the IOT module 1402 includes a thermostat controller operable by the user to remotely (e.g., wirelessly) control the state of the relay 1404 which, in turn, operates the PTAC 1406 in much the same way (typically a wired connection) as the wall mounted thermostat previously did so before being replaced (or augmented) by the relay.

Figure 15:
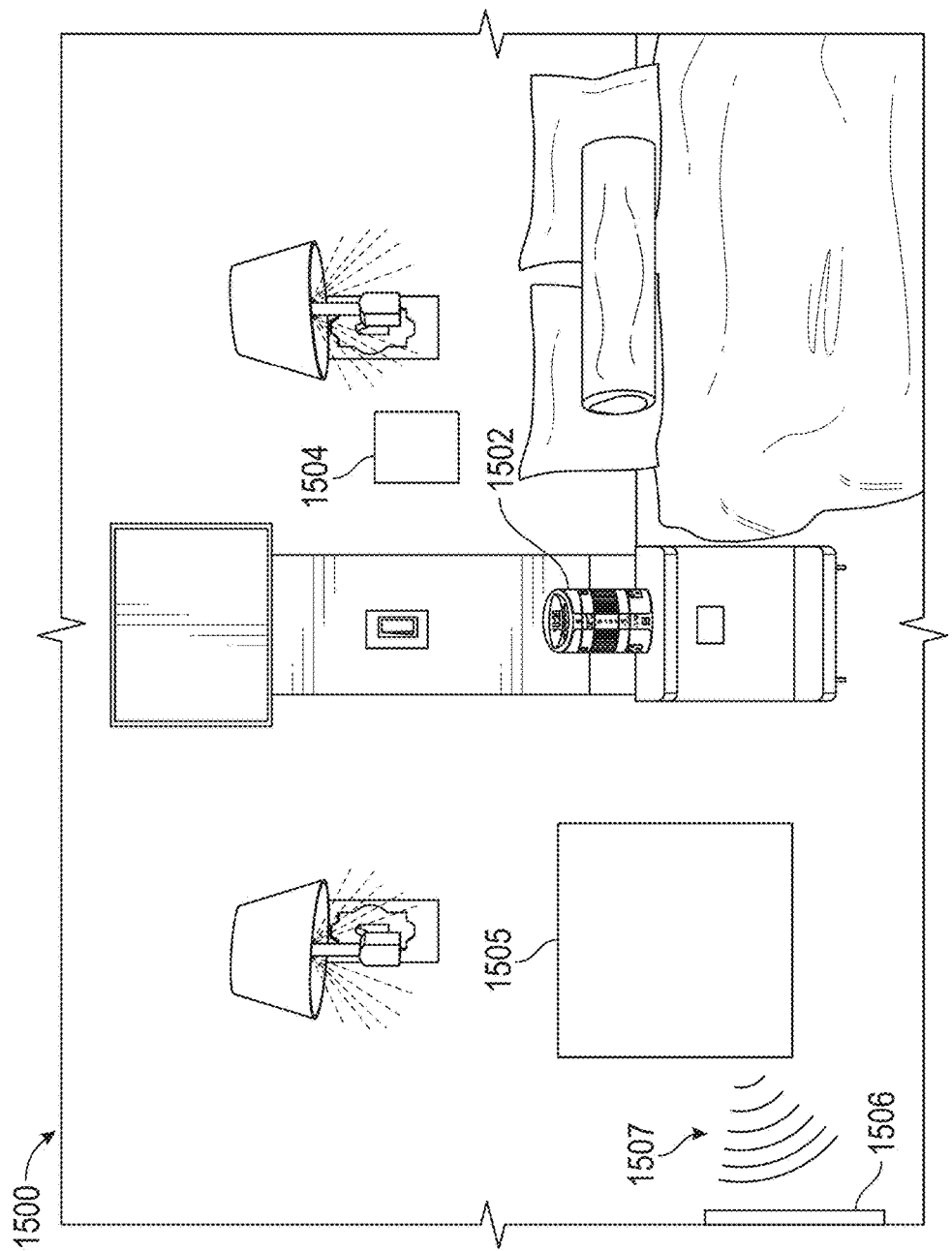
FIG. 15 is schematic diagram of an in-room. IOT module configured to wirelessly communicate with a secondary wireless module which wirelessly controls a PTAC or any other HVAC unit in accordance with various embodiments.

In an alternate embodiment, FIG. 15 depicts a remote thermostatic control system 1500 including an IOT module 1502 and other in-room connected array of sensors configured to communicate (e.g., wirelessly) with one or more secondary wireless modules 1504, 1505, and an HVAC unit 1506 (e.g., a PTAC). In the embodiment shown in FIG. 15, the IOT module 1502 includes a thermostat module which transmits (e.g., wirelessly) a desired temperature setting (e.g., set point) to one or both of the secondary wireless modules 1504, 1505 to thereby operate (e.g., wirelessly 1507) the PTAC 1506. In one embodiment, the user controls the PTAC 1506 using a handheld device 1504 (e.g., mobile phone, laptop, or other remote control device) which optionally displays a graphical user interface. In an alternate embodiment, the user may control the PTAC 1506 using a large screen display (e.g., computer monitor or television) which optionally displays a graphical user interface.

The embodiments described in conjunction with FIGS. 14 and 15 are particularly advantageous in that the temperature sensor associated with the thermostatic control system may reside within the bedside or table top IOT module removed from the wall. In either case, the sensed temperature corresponds to the temperature proximate the hotel guest, particularly whilst the guest is sleeping. This allows the system to more precisely control the relevant temperature, ensuring thermal comfort while conserving electricity by avoiding unnecessarily heating or cooling regions of the guest room not occupied by the guest.

Referring now to FIG. 16, a distributed monitoring and sensing system 1600 includes an in-room IOT module 1602 coupled (e.g., wirelessly) to a plurality of distributed sensors 1604, 1606, 1608 equipped to monitor motion and/or temperature at a plurality of zones. For example, a first sensor 1604 may detect the temperature (or other environmental conditions such as smoke, carbon monoxide, brightness level, sound, and/or humidity) as well as the presence of or motion of people (or pets) in a region of the room remote from the bedroom. A second sensor 1606 may be configured to monitor one or more of the foregoing parameters proximate a balcony or window. A third sensor 1608 may be configured to monitor one or more of the foregoing parameters proximate a sitting area, an additional room, or other strategic location within the guest suite.

In accordance with the foregoing embodiments, by monitoring environmental parameters and the presence or motion of people at various locations within the living quarters, the system may precisely monitor and/or control energy and other resource consumption. By way of non-limiting example, the system may be configured to open or close window curtains or blinds in coordination with sunrise, sunset, and overcast conditions to thereby influence temperature control within the entire room or within discreet zones. Moreover, the system may optimize temperature, other environmental conditions, or the use of electronic devices as people migrate into and out of the living quarters or sub-zones thereof. The system will also allow for guest to migrate their personal preferences from property to property.

In accordance with further embodiments, the in-room IOT module and/or the underlying operating platform may include incentive, reward, or point based components configured to gamify energy conservation objectives. For example, the system may be configured to compile individual guest and/or aggregate data surrounding consumption of electricity, gas, cold water, hot water, towel and bed linen usage, and other consumables. By establishing usage targets or thresholds, hotel guests may earn loyalty credits or other redeemable points in a gamified context, while at the same time promoting "green" conservation policies.

In an embodiment, cellular data to and from the guest mobile device may be routed thru the CIRQ cloud 106 back to the hotel chain server 108 (See FIG. 1). Various use cases enabled by the system share the following features: i) a PaaS System; ii) an in-room IOT control hub module which communicates with the mobile app and various edge devices and hotel services (food, drinks); and iii) tracking of guest location in the CIRQ cloud. The integration of the in-room IOT network with guest tracking data gives rise to a vast array of novel features, use cases, and anecdotal attributes, including the following non-limiting examples.

In a typical swimming pool, beach, golf course, concert venue, or other resort environment having multiple potential guest locations (e.g., bar stools, tables, cabanas, chaise lounges, stadium seats), location awareness allows the server to walk a straight line to bring the correct drink or food order directly to the right guest.

Predictive analytics may be used in conjunction with tracking data. For example, if a guest returns to the guest room at the same time (e.g., 6:00 p.m.) several days in a row, the system may begin pre-cooling the room in anticipation of the guest returning, for example at 5:45 p.m. The system may be configured to fully cool the room when the guest actually enters the geo-fence surrounding the hotel property.

When a guest returns to a particular city, the system can recommend the same or similar restaurants based on previous visits to that city, or even monitor the guest's restaurant reviews (e.g., Yelp) to see how well the guest liked the food and/or venue, and make recommendations accordingly.

Targeted marketing can be in the form of a wrapper around newspaper left in the room or outside the room door. Alternatively, targeted marketing may take the form of text messages (e.g., SMS), notices and offers, or a short video displayed on the in-room television when turned on by the guest.

When incenting a guest to enable location services, for example in the context of a rewards program or an enhanced gamification opportunity, the system may be configured to offer enhanced (e.g. double) points or other incentives for qualified purchases if the location service is enabled, and further enhanced (e.g., tripled) points or other incentives if the guest allows ads to be pushed to their smart phone. Additionally the gamification feature may allow guests to receive additional incentives for limiting their power usage in the room (e.g., turning off lights, adjusting the temperature higher while away from the room, using towels/linens for more than one day, limiting water usage in the shower, faucet, and other water interfaces.

As an additional revenue source, the restaurants or other venues, for example through partnerships or by sponsoring targeted ads, may be required to pay the property owner (e.g., resort operator, hotel chain, time share aggregator) a percentage of payments for the privilege of pushing targeted ads to captive and presumably high income consumers (e.g., the members of a particular loyalty or rewards program) or guests that are using the mobile app for the first time which would make the guest feel more comfortable in the hotel and building loyalty for the hotel. Additionally, in return for presenting and redirecting the guest to off-property locations, restaurants and services, the hotel owner could receive a percentage of the transaction.

When location services detect that a guest is leaving the hotel property around dinner time, the system may be configured to push a contextually aware message to the guest's phone, such as a happy hour drink special at the hotel bar in an attempt to keep the guest on the property. If the guest accepts, the system can subsequently push an ad for a dinner special (e.g., a reduced price) at the hotel restaurant, for example if the guest remains in the bar more than 15 minutes.

Location awareness may be used to identify the names of guests as they approach the front desk, the bar, concierge, or any other venue, thereby allowing resort employees to address guests by name.

Location awareness may also be used to display guest names on a digital sign or other display (e.g., a welcome sign) as each guest approaches the sign. Moreover, location awareness may be used to determine which floor an elevator need to go to transport a guest to the correct room, effectively eliminating the need to press elevator buttons on premium floors.

Contextual awareness may involve the use of previous data to determine a particular guest's food allergies, liquor preferences (e.g., Bombay gin), and/or food preferences (e.g., gluten free options).

When incenting a guest to enable location services, for example in the context of a loyalty program, the system may be configured to award double points (or a 15% discount privilege) if the guest uses the app while on the property, and to award triple points (or a 30% discount privilege) for so long as the guest continues to enable the location service after leaving the property.

In an embodiment the guest can use the in-room module to control the local IOT devices even without downloading the app, but the guest can control the module with the mobile device if the guest downloads the app to the mobile device.

The system may be configured to link with Air B&B, Travelocity, or other travel related sites to gather a list of people going to a particular destination (e.g., San Diego) for a particular purpose (e.g., to stay at a timeshare) during a particular time period (e.g., next week), and send contextually aware targeted ads to the entire group; that is, since they are staying at a timeshare, the system presumes they are leisure travelers (as opposed to business) and can send targeted ads promoting a leisure attraction, such as Sea-World.

Although preferred embodiments are described in the context of hotel room, those skilled in the art will appreciate that IOT control modules may be installed in any number of environments such as Air B&B rentals, condominium communities, and the like.

In an embodiment, the in-room IOT module may be configured to remotely control an access feature such as a door lock, where the guest can use the mobile app to configure access preferences, such as sending a unique code in an SMS message, or using tracking to unlock the door when the guest is within a predetermined distance (e.g., ten feet) from the door. After check out, the system can send a different code to the next guest, and yet another code to housekeeping personnel. The system can also provide security alerts advising the guest that someone entered the room such as room housekeeping, maintenance or property management.

In another embodiment the hub with integrated colored LEDs can pulse or glow when the alarm goes off to slowly wake the guest and delivering a more pleasant awakening experience.

In another embodiment, the hotel facilities manager can remotely lock, unlock, check the locked status, or change the access code for IOT connected room door locks.

When incenting a guest to enable location services, the system may be configured to offer premium movie channels, Hulu-type streaming or music services, or complimentary nightclub passes (based on guest demographics). Additionally the hub may allow for streaming media from guests' personal mobile devices such as video and audio through the system and to other peripheral devices such as in room TV's.

In other embodiments the guest can select a desired perk (incentive) in exchange for enabling location services, where the perks are harvested from aggregate data (e.g., where do people in this age bracket or other demographic metric tend to dine, are they motivated by discounts, drink specials, enhanced reward points, iTunes credits).

The system may also use aggregate location data to dynamically allocate personnel and resources in real time. For example, as more guests go to the bar, pool, restaurant, or conference center, hotel management can allocate and dispatch service additional personnel as needed.

In another embodiment, the system can be configured to use tracking data to identify approaching guests, and to discretely speak the guest names into a hotel employee's ear piece to thereby allow the employee to address the guest by name.

In various embodiments, the mobile device communicates with the in-room IOT controller via Bluetooth or other protocol while the guest is in the room, but when the guest leaves the room the app can transition so that the mobile app send location data directly with the CIRQ cloud.

In various embodiments, the system may be configured to monitor the room with a motion sensor in addition to or in lieu of location tracking to determine when the room is vacant and the temperature can be adjusted or roll back to a preconfigured setting, fans and television turned off or lights dimmed. In addition, room occupancy detection and analysis allows the system to ignore incidental or transient occupancy (e.g., by housekeeping or administrative personnel) and to forego turning on the air conditioning when hotel staff are in the room but the guest is absent from the room.

In an embodiment, the in-room IOT control system includes a thermostat control module which may be disposed bedside or on a table inside the room. In this way, the guest may adjust the room temperature from their bed without getting up. In addition, the thermostat control module may be configured to transmit a wireless control signal to a wall mounted relay receiver which, in turn, communicates the control signal to an IOT relay which interfaces with the building HVAC system. Alternatively, the guest can adjust the room temperature using the mobile app to control the remote relay thermostat or adjust the temperature with the controls on the wall relay.

In an embodiment, as the guest is returning to the room but still outside the property geo-fence, the mobile app sends location data to the CIRQ cloud over cellular or Wi-Fi, whereupon the CIRQ cloud sends the data to the hotel property's server, which tells the in room device to anticipatorily adjust environmental controls; when the guest enters the room, the phone switches to Bluetooth communication with the in-room IOT control module.

In various embodiments, the motion sensor, array of sensors, and tracking feature can coordinate to record a log of how much time the guest spends sleeping, at on property venues (e.g., business center, hotel bar), and at off property venues, and infer leisure and spending trends from aggregate location and occupancy data.

The invention claimed is:

1. A method of enhancing engagement between a hotel room guest and an internet-of-things (IOT) controller of the type including a base module having a speaker and configured for table-top mounting, a control system operable by a guest in the hotel room to control the room environment, and a touch interactive screen extending above the base module, the method comprising:
displaying a digital representation of a mouth on the screen; and
synchronizing movement of the mouth with synthesized speech played through the speaker;
wherein the digital mouth includes top and bottom lips, and the step of synchronizing comprises displaying the digital mouth: i) in a partially expanded position when the controller is preparing to play synthesized speech; ii) in a fully expanded position with lips partially spaced apart when the controller begins synthesized speech; and iii) in a fully expanded position with lips fully spaced apart when the controller completes synthesized speech speaking;
wherein synchronizing further comprises at least one of: i) moving the top lip relative to the bottom lip; ii) moving the bottom lip relative to the top lip; and iii) moving both lips;
providing the TOT controller with access to an emoji database;
retrieving an emoji expression from the database;
integrating the emoji expression into the mouth during synthesized speech;
using artificial intelligence to determine the guest's mood; and
adjusting an attribute of the room environment and an attribute of the synchronized mouth movement to adapt to the guest's mood.

2. The method of claim 1, further comprising adjusting an attribute of the synthesized speech to adapt to the guest's mood.

3. A hotel room internet-of-things (IOT) controller, comprising:
a base module configured for table-top mounting;
a control system operable by a guest in the hotel room to wirelessly control temperature, music, and lighting;
a touch interactive screen extending above the base module, the screen including a digital representation of a mouth, wherein movement of the mouth is synchronized to synthesized speech spoken through a speaker associated with the controller, and the screen comprises a substantially circular display;
a snooze button,
a lamp, and
a sensor configured to detect respiratory breathing rhythms of sleeping guests.

4. The controller of claim 3, wherein the base module display comprises a cylindrically shaped body having a top circumference and a vertical axis, the screen is mounted proximate the top circumference, and the screen is tilted at a predetermined angle relative to a plane orthogonal to the horizontal axis.

5. The controller of claim 4, wherein the predetermined angle is in the range of 30 to 90 degrees.

6. The controller of claim 5, wherein the predetermined angle is in the range of 45 to 60 degrees.

7. The controller of claim 5, wherein the predetermined angle is about 56 degrees.

8. The controller of claim 3, further including an emoji database, wherein the controller is configured to retrieve an emoji expression from the database; and integrate the emoji expression into the mouth during synthesized speech.

9. The controller of claim 3, further comprising a microphone for detecting guest voice commands, and a speaker for playing synthesized speech responsive to the voice commands.

10. The controller of claim 9, wherein the digital mouth includes top and bottom lips, and the controller is configured to display the digital mouth:
i) in a rest position when the controller is silent;
ii) in a partially expanded position when the controller is preparing to speak;
iii) in a fully expanded position with lips partially spaced apart when the controller begins speaking; and
iv) in a fully expanded position with lips fully spaced apart when the controller finishes speaking.

11. The controller of claim 10, wherein the top lip moves relative to the bottom lip.

12. The controller of claim 10, wherein the bottom lip moves relative to the top lip.

13. The controller of claim 10, wherein the top and bottom lips each move relative to each other.

14. The controller of claim 10, further comprising an emoji database from which expressions are retrieved and integrated into the mouth during synthesized speech.

* * * * *

UNITED STATES PATENT AND TRADEMARK OFFICE
CERTIFICATE OF CORRECTION

| | |
|---|---|
| PATENT NO. | : 11,064,565 B2 |
| APPLICATION NO. | : 16/418935 |
| DATED | : July 13, 2021 |
| INVENTOR(S) | : Yani Deros and Jodi Deros |

It is certified that error appears in the above-identified patent and that said Letters Patent is hereby corrected as shown below:

On the Title Page

Insert after said title and before said inventors --Applicant ATOM, Inc., Scottsdale, AZ (US)-- and;
After said inventors insert --Assignee ATOM, Inc., Scottsdale, AZ (US)--.

Signed and Sealed this
First Day of October, 2024

*Katherine Kelly Vidal*

Katherine Kelly Vidal
*Director of the United States Patent and Trademark Office*